United States Patent [19]
Aoki et al.

[11] Patent Number: 5,828,456
[45] Date of Patent: *Oct. 27, 1998

[54] MULTIAXIS LASER INTERFEROMETRY DISTANCE MEASURING DEVICE

[75] Inventors: Tatsuya Aoki; Kazunori Tanaka, both of Kanagawa, Japan

[73] Assignee: Sokkia Company Limited, Tokyo, Japan

[*] Notice: The term of this patent shall not extend beyond the expiration date of Pat. No. 5,808,740.

[21] Appl. No.: 734,070

[22] Filed: Oct. 21, 1996

[30] Foreign Application Priority Data

Nov. 15, 1995 [JP] Japan .................................. 7-296909
Mar. 27, 1996 [JP] Japan .................................. 8-072290

[51] Int. Cl.$^6$ ........................................................ G01B 9/02
[52] U.S. Cl. ................................... 356/358; 356/351
[58] Field of Search .............................. 356/345, 358, 356/351

[56] References Cited

U.S. PATENT DOCUMENTS 4,976,019 12/1990 Kitamura ................................. 356/358

FOREIGN PATENT DOCUMENTS 62-274202 11/1987 Japan .
210201 1/1990 Japan .
222503 1/1990 Japan .
5306904 11/1993 Japan .

*Primary Examiner*—Robert Kim
*Attorney, Agent, or Firm*—Sixbey Friedman Leedom & Ferguson

[57] ABSTRACT

Interferometer 14 is equipped with a beam directing mechanism portion for causing the incoming laser beam to be reflected in the x, y, and z axis directions and a switching mechanism for the beam directing mechanism portion. Computer 20 provides driving commands sequentially to NC controller 22 in accordance with the contents of a measurement program to thereby operate milling machine A in accordance with a prescribed procedure, calculates correction data by comparing the distance measurement data, obtained at the beam source portion 12, with reference data, causes the correction value to be taken into NC controller 22, and starts up controller 24 and operates the switching mechanism of the multiaxis interferometer 14 after the end of work for each axis to change the axial direction measured.

5 Claims, 23 Drawing Sheets

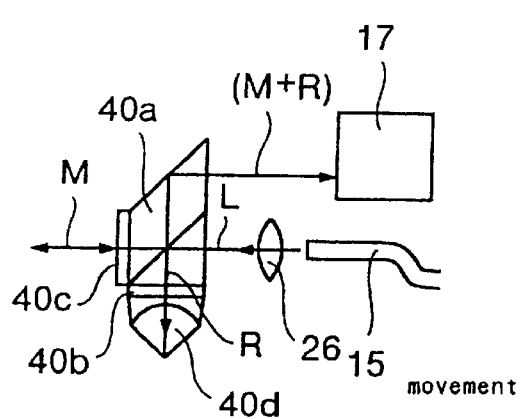
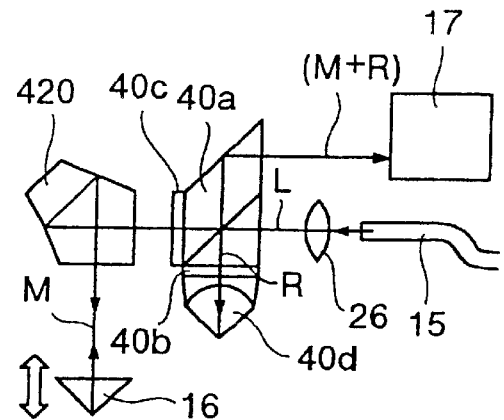
FIG. 5(a)     FIG. 5(b)
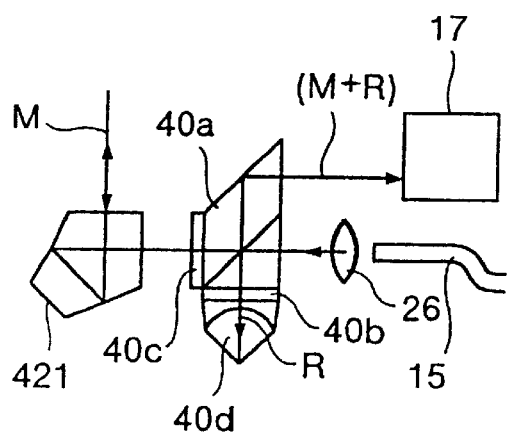
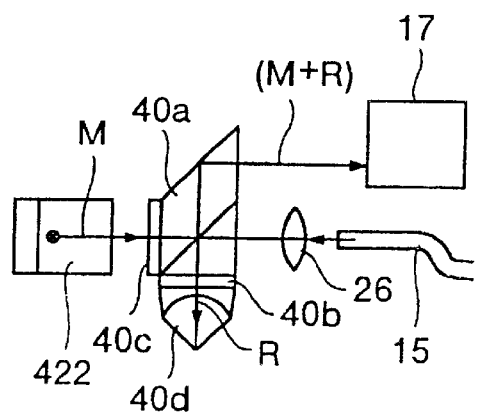
FIG. 5(c)     FIG. 5(d)

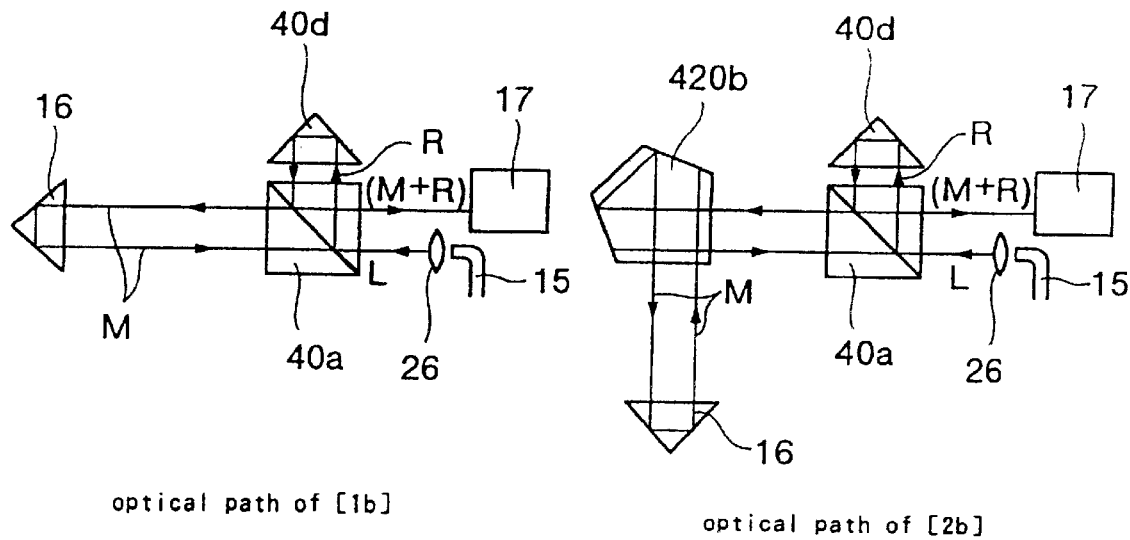
optical path of [1b]
FIG. 14(a)
optical path of [2b]
FIG. 14(b)
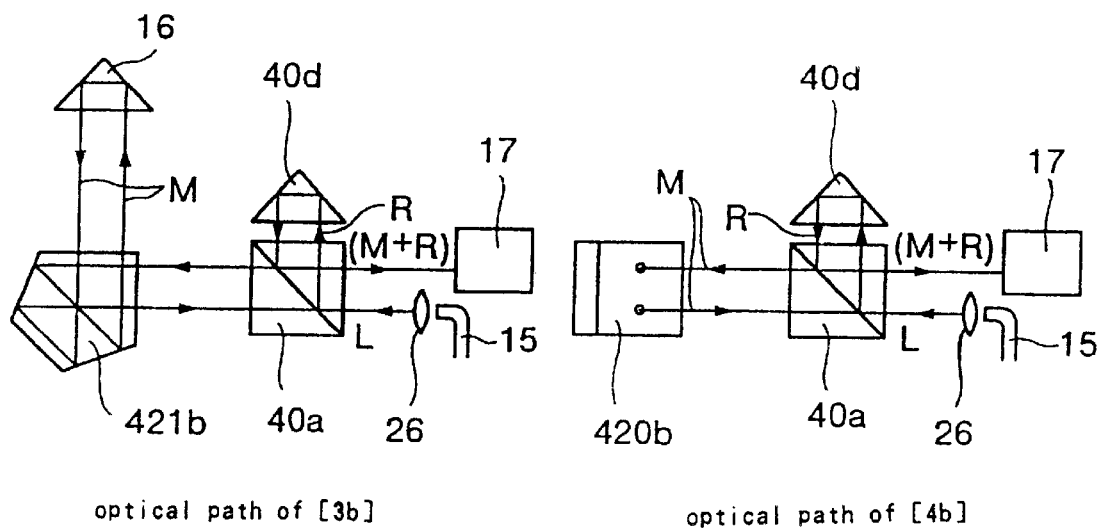
optical path of [3b]
FIG. 14(c)
optical path of [4b]
FIG. 14(d)

MULTIAXIS LASER INTERFEROMETRY DISTANCE MEASURING DEVICE

BACKGROUND OF THE INVENTION

The present invention relates to multiaxis distance measuring devices and more particularly to distance measuring devices which enable automatic distance measurements of a plurality of axes of an NC machine tool.

Laser distance measuring devices are known as devices for measuring the movement distance of each axis of an NC machine tool with high accuracy. Such a type of laser distance measuring device has a basic arrangement comprising a laser head, equipped with a laser beam emitting portion and an interference beam receiving portion, a target prism (corner cube), which reflects the laser beam emitted from the laser beam emitting portion, and an interferometer, which is disposed between the above portions.

To measure the movement distance of an NC machine tool, the target prism is fixed on a moving table or a spindle. The directions of movement of the NC machine tool usually consist of the three axial directions of x, y, and z, and if, for example, distance measurements of a movable table of a knee type vertical milling machine A are to be made as shown in FIG. 20, laser head 1 is first fixed on a tripod by a worker so that it faces the x axis direction, the interferometer 2 is then set at a position on the spindle of milling machine A and fixed to be in alignment with the optical axis of the laser head, and the target prism 3 is fixed at a position of the movable table along the extension of said optical axis.

This procedure is usually referred to as alignment and it takes about 15 minutes of working time to align each optical axis, set the respective home positions, etc.

After the x axis alignment work, distance measurements and corrections or calibrations are made while actually moving the table in the x axis direction with respect to the home position.

The process after the x axis alignment work is executed sequentially by a program in a control unit, such as a computer, that is connected to the NC controller and in this process, the checking and correcting of the x axis movement pitch and other various accuracy tests, such as tests that are in accordance with the contents of ISO tests, are performed automatically and the measurement results and corrections or calibrations are sequentially provided to the NC controller. Such measurements and corrections of calibrations take approximately 50 minutes for completion. When the measurements for the x axis direction have been completed, the laser head 1, interferometer 2, and target prism 3 are arranged by the worker for the y axis direction in a manner similar to that described above and after the y axis alignment work, accuracy tests are performed automatically as described above. Thereafter, the z axis alignment work is performed and accuracy tests are performed automatically. The measurements for the three axial directions are thus completed.

However, the following technical problem has been raised concerning such a conventional distance measuring method for NC machine tools.

That is, with the distance measurement method described above, since it takes about 15 minutes of working time to adjust the optical axis, set the home positions, etc. for each axis (x, y, z) and since the time (approximately 50 minutes) for the measurements and corrections or calibrations for each axis (x, y, z) are added to the above time, the entire process takes approximately 195 minutes.

In this case, the worker may perform other work while the automatic measurements for each axis (x, y, z) are being performed. A spare time of 50 minutes between each measurement process may seem long. However, this amount of time is actually short for a worker and he/she may not be able to concentrate on the other work or may lose time in the other work to cause delays in the alignment work for each measurement process. Such time management has therefore been extremely troublesome for workers.

SUMMARY OF THE INVENTION

In order to achieve the above object, the present invention provides a multiaxis laser distance measuring device comprising a beam source portion for emitting a laser beam, a multiaxis interferometer equipping an interferometer body, which splits the incoming laser beam, directs the beam toward the orthogonal x, y, and z axes of an NC machine tool, and transmits the interference beam resulting from the interference of the measuring beam with the reference beam, and a switching mechanism for the interferometer body, an optical fiber, which is disposed between the beam source portion and the interferometer body and guides the laser beam from the beam source portion to the interferometer body, a plurality of reflecting targets, which are fixed on the measurement positions of the NC machine tool and receive the laser beam projected in the x, y, or z axis direction and reflects the beam back towards the interferometer body, a beam receiving portion for receiving the interference beam from the interferometer body, a controller for controlling the switching mechanism, and a control unit, which operates the NC machine tool in the x, y, and z axis directions in accordance with a prescribed procedure, compares the distance measurement data, obtained by the beam receiving portion at the beam source portion, with priorly set reference data to provide the NC machine tool with correction values, and commands the switching operation to the controller each time the measurements for one of the axes, x, y, and z, have been completed.

Since the multiaxis laser interferometry distance measuring device with the above arrangement is provided with an optical fiber, which is disposed between the beam source portion and the interferometry portion of the multiaxis interferometer and which guides the laser beam from the beam source portion to the interferometry portion, one needs to perform the optical alignment of the multiaxis interferometer and the reflecting targets positioned in the x, y, and z axis directions of the multiaxis interferometer only once and distance measurements can then be performed in a continuous manner through the automatic switching of the projection direction of the multiaxis interferometer after the distance measurement process for each axis.

According to claim 2, the multiaxis interferometer comprises a casing having an entrance/exit window portion which faces the laser head, a stage, which is disposed within the casing in a linearly movable or rotatably movable manner so that it may face the entrance/exit window portion, and an interferometer body having a beam directing mechanism portion for causing the incoming laser beam to be projected towards the x, y, or z axis and an interferometry portion and the switching mechanism comprises a moving mechanism for moving the stage linearly or rotatably to cause the beam directing mechanism portion to face the entrance/exit window portion and a detection means for detecting the stoppage position of the stage.

The interferometer body may also be disposed along the movement direction of the moving mechanism and be provided with the interferometry portion being fixed and set on the stage and with the beam directing mechanism portion being set on the stage and to the rear of the interferometry portion, said beam directing mechanism having a part for causing the incoming beam from the interferometry portion to propagate rectilinearly, a part for reflecting the incoming beam from the interferometry portion upward or downward, and a part for reflecting the incoming beam from the interferometry portion to the side.

Furthermore, the interferometer body may be provided with the interferometry portion being fixed and set on the rear side of the entrance/exit window portion and with the beam directing mechanism portion being set on the stage side, said beam directing mechanism having a part for causing the incoming beam from the interferometry portion to propagate rectilinearly, a part for reflecting the incoming beam from the interferometry portion upward or downward, and a part for reflecting the incoming beam from the interferometry portion to the side.

The present invention was proposed to resolve such a problem, and it is therefore an object of the invention to provide a multiaxis distance measuring device which enables automatic distance measurements for all of the axis, x, y, and z, without having to perform the work of aligning the beam source with the interferometer.

As described in detail by way of the preferred embodiment described later, with the multiaxis distance measuring device for NC machine tools by the present invention, since the work of aligning the multiaxis interferometer with the beam source become unnecessary and since the distance measurements for each axis can be performed automatically once the optical axes of the targets positioned in the x, y, and z axis directions have been adjusted, the worker will not have to be bound by the waiting time for the next work and can dedicate him/herself to other work.

Another advantage of the invention is to perform the measurements of each axis of an NC machine tool in a continuous manner automatically.

BRIEF DESCRIPTION OF THE DRAWINGS

In order that the device in which the above-recited objects and advantages of the invention are achieved can be understood in detail, a more particular description of the invention will now be made by reference to specific embodiments thereof which are illustrated in the accompanying drawing, which forms a part of this specification.

In the drawings:

FIGS. 5(a) to 5(d) are explanatory diagrams which show the beam paths of the respective parts of the interferometer body shown in FIG. 4.

FIGS. 14(a) to 14(d) are an explanatory diagram of the beam paths of each portion of the interferometer shown in FIG. 13.

DESCRIPTION OF THE PREFERRED EMBODIMENTS

Figure 1:
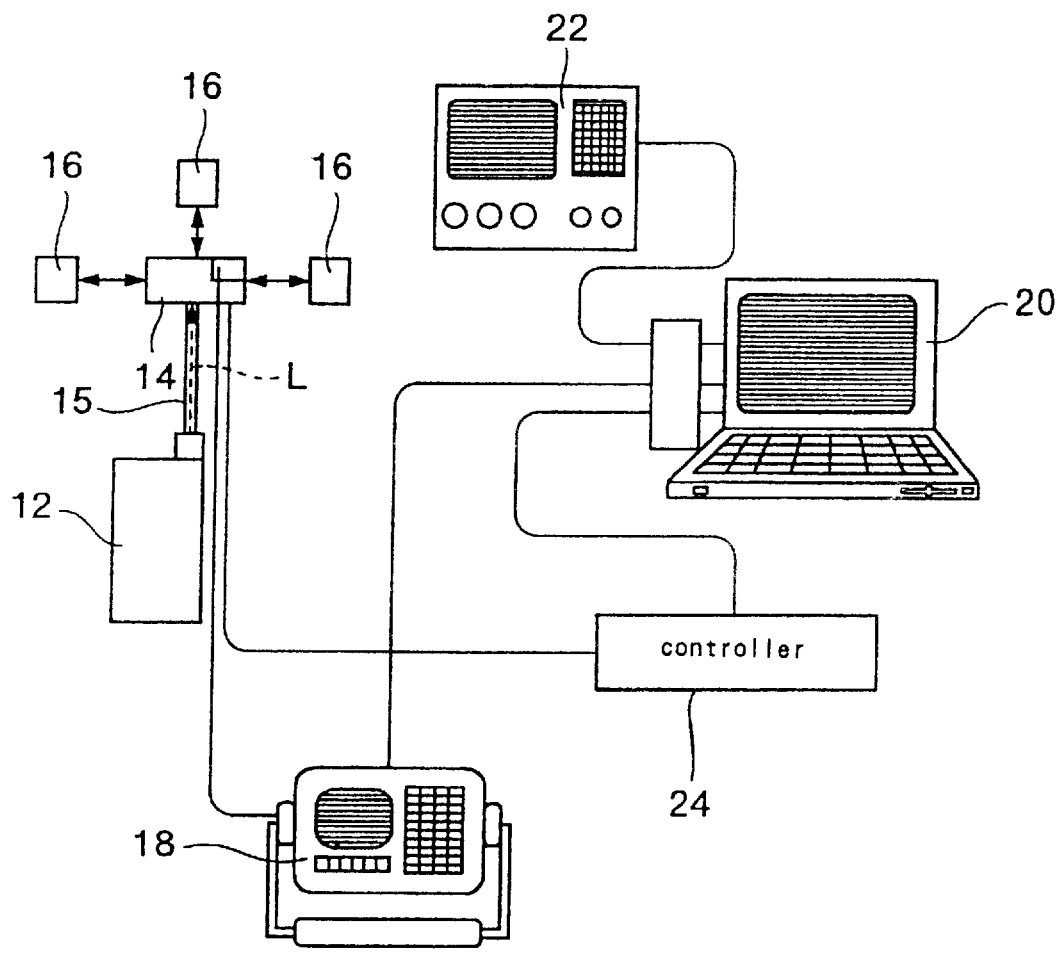
FIG. 1 shows the overall systematic arrangement of a first preferred embodiment of the multiaxis laser distance measuring device by the present invention.

Preferred embodiments according to the invention shall now be described in detail with reference to the attached drawings. FIG. 1 thru 9 show the first preferred embodiment of the multiaxis laser interferometry distance measuring device by the present invention. As can be seen from the systematic arrangement shown in FIG. 1, the distance measuring device shown in these Figures is comprised of a beam source portion 12 with a built-in laser tube, which emits laser beam of a certain wavelength, a multiaxis interferometer 14, an optical fiber 15, three reflecting targets 16, a display 18 connected to beam receiving portion 17 provided at the multiaxis interferometer 14, a computer (control unit) 20, an NC controller 22 for controlling the NC machine tool, and a controller 24 for the multiaxis interferometer 14.

Figure 2:
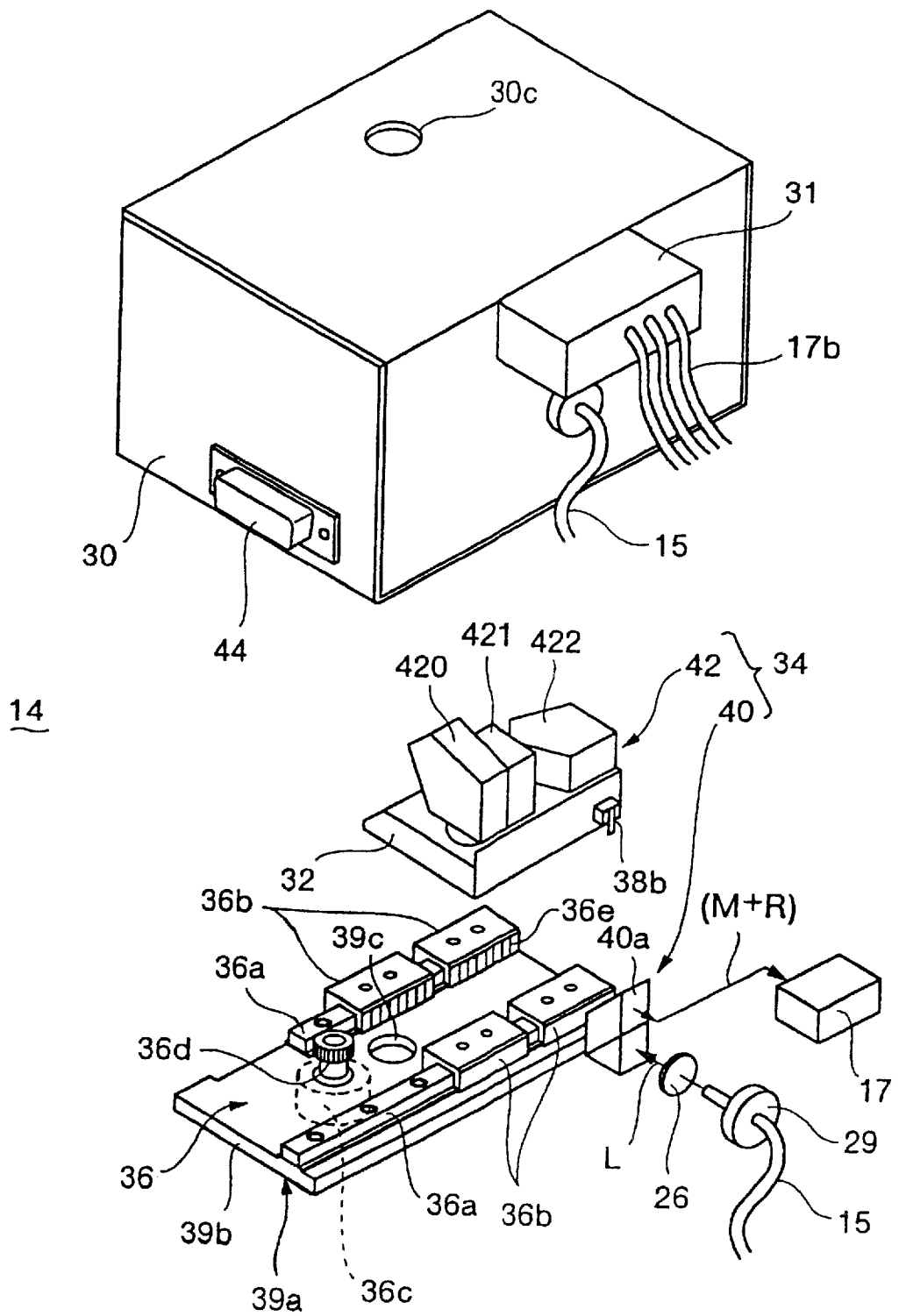
FIG. 2 is an exploded perspective view of the multiaxis interferometer of said multiaxis laser distance measuring device.
Figure 3:
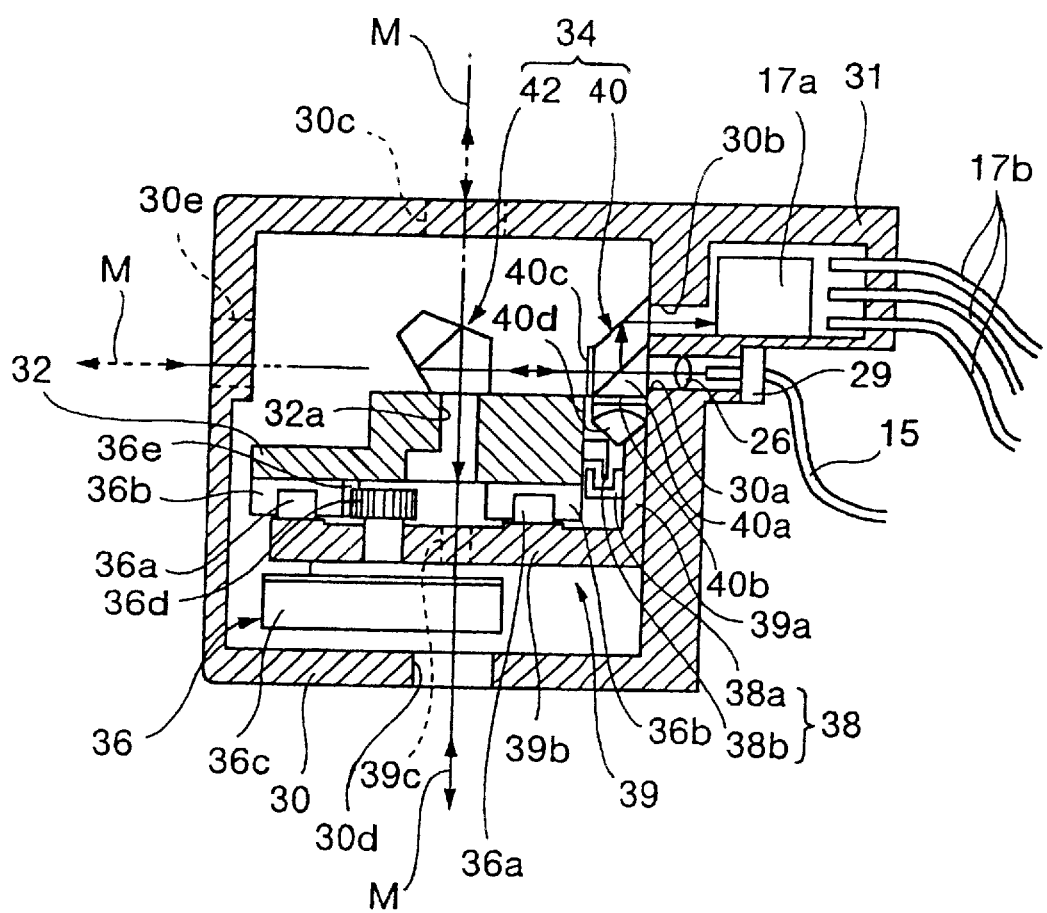
FIG. 3 is a cross-sectional view of said interferometer.
Figure 4:
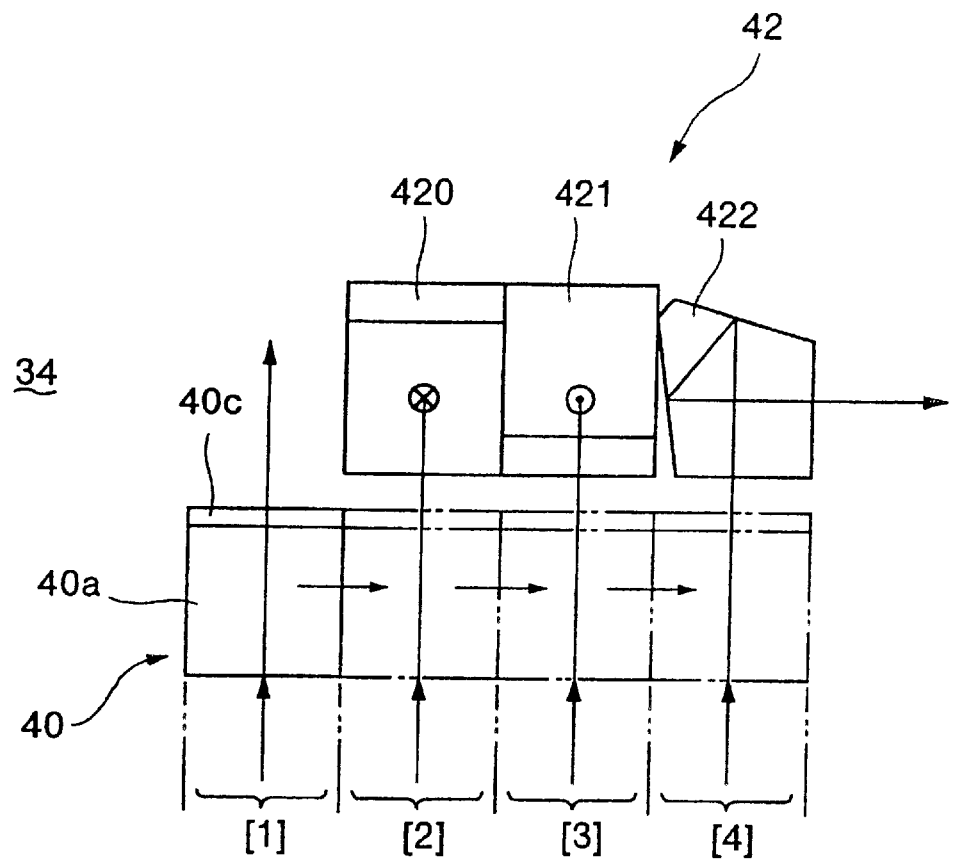
FIG. 4 is an explanatory diagram of the interferometer body of said interferometer.

A laser tube, which emits a laser beam L of a certain wavelength towards the multiaxis interferometer 14, is built into the beam source portion 12. The structural details of the multiaxis interferometer 14 are shown in FIGS. 2 to 5. FIG. 2 is an exploded perspective diagram of the major portions of the overall structure of the multiaxis interferometer 14 and FIG. 3 shows a cross-sectional structure of the multiaxis interferometer 14.

The multiaxis interferometer 14 according to the preferred embodiment is formed in a box shape and is provided with a casing 30, a stage 32, an interferometer body 34, and a moving mechanism 36, which comprises the switching mechanism, a detection means 38, and a mounting base 39. An entrance window portion 30a, which faces one end of the optical fiber 15 via condenser lens 26, and an exit window portion 30b, which faces beam receiving portion 17, are opened through one side face of the casing 30.

Through holes 30c to 30e are respectively provided on the upper and lower faces of the casing 30 and the face of the casing 30 opposite entrance and exit window portions 30a and 30b and through these through holes 30c to 30e, the measuring beam M is projected towards each reflecting target 16 from the interferometer body 34 and returns to the interferometer body 34 upon being reflected by reflecting target 16.

The stage 32 is disposed within the casing 30 in a linearly movable manner so as to face entrance and exit windows portion 30a and 30b. The interferometer body 34 is comprised of an interferometer portion 40 and a beam directing mechanism portion 42. Interferometer portion 40 is comprised of a polarization beam splitter 40a, a pair of ¼ wave plates 40b and 40c, which are respectively positioned at the lower face and rear face of a polarization beam splitter 40a, and a corner prism 40d, which is fixed to the lower face of the ¼ wave plate 40b.

This interferometer portion 40 is supported on a mounting base 39 having a vertical portion 39a fixed to the inner face of the casing 30. The beam directing mechanism portion 42 is comprised of four portions, [1] to to [4], and these portions [1] to [4] are arranged on the stage 32 in a single row along the movement direction of the stage 32. Portion [1] is not provided with anything.

Portion [2] is provided with a pentagonal prism 420, which reflects the incoming beam from the polarization beam splitter 40a downward. Portion [3] is provided with a pentagonal prism 421, which reflects the incoming beam from the polarization beam splitter 40a upward. Portion [4] is provided with a pentagonal prism 422, which reflects the incoming beam from the polarization beam splitter 40a to the right.

A moving mechanism 36 is comprised of a pair of linear guides 36a, which are parallely fixed on the upper face of a horizontal portion 39b of the mounting base 39, a plurality of sliders 36b, which are engaged with linear guides 36a in a slidably movable manner, a driving motor 36c (ultrasonic motor), a pinion 36d, which is fixed to the rotating shaft of driving motor 36c, and a rack 36e, which is fixed to the inner side of one of the sliders 36b and engaged with pinion 36d.

Each slider 36b is fixed to the lower side of stage 32. In the movement mechanism 36 with the above arrangement, the stage 32 is moved rectilinearly along the linear guides 36a when the driving motor 36c is caused to rotate. The detection means 38 is for detecting the positions, at which each of the portions [1] to [4], of the polarization beam splitter 40a provided on the stage 32, becomes positioned along the same optical axis as and faced with the polarization beam splitter 40a of the interferometry portion 40 upon movement of the stage 32 by the moving mechanism 36, and is comprised of a plurality of photointerrupters 38a, which are fixed to the inner face of vertical portion 39a of the mounting base 39, and a detection piece 38b, which projects from the side face of stage 32.

The plurality of photointerrupters 38a respectively correspond to portions [1] to [4] of the beam directing mechanism portion 42. The lead wires of the driving motor 36c and photointerrupters 38a are lead out to the exterior via a connector 44, provided on the side face of the casing 30, and connected to the controller 24. The holes 32a and 39c are bored in the stage 32 and mounting base 39, respectively, in correspondence to the through hole 30d bored in the lower face of the casing 30.

FIG. 5 shows the details of the beam paths of the four portions [1] to [4] of the said beam directing mechanism portion 42. At portion [1], shown in FIG. 1(a), the incoming beam L from the optical fiber 15 is split by the polarization beam splitter 40a into the measuring beam M, which is rectilinearly transmitted through the polarization beam splitter 40a, and the reference beam R, which is directed downward towards the corner prism 40d in a direction orthogonal to the measuring beam M, and the interference beam (M+R) passes above the incoming beam L and is received by the beam receiving portion 17.

At portion [2], although the reference beam R and the interference beam (M+R) travel along the same beam paths as those of portion [1], the measuring beam M is reflected by pentagonal prism 420 and propagates parallel to and in the same direction as reference beam R towards reflecting target 16.

At portion [3], although the reference beam R and the interference beam (M+R) travel along the same beam paths as those of portion [1], the measuring beam M is reflected by pentagonal prism 421 and proceeds parallel to but in the opposite direction of the reference beam R towards reflecting target 16.

At portion [4], although the reference beam R and the interference beam (M+R) travel along the same beam paths as those of portion [1], the measuring beam M is reflected by pentagonal prism 422 and proceeds towards reflecting target 16 in the direction orthogonal to the optical axis of incoming beam L.

The optical fiber 15 is disposed between the beam source portion 12 and multiaxis interferometer 14 and is for guiding the laser beam emitted from the beam source portion 12 to the interferometer body 34 of the multiaxis interferometer 14 and its exit face is supported at the center of entrance window portion 30a of the casing 30 and faces the interferometer body 34 via condenser lens 26. The member indicated by the symbol 29 in FIG. 3 is a supporting spacer 29 for the optical fiber 15.

Figure 6:
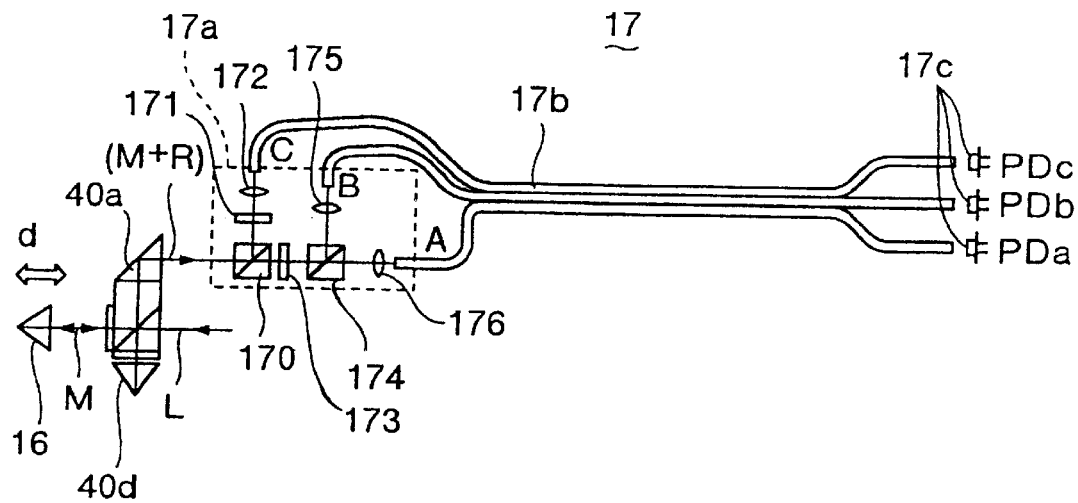
FIG. 6 is an explanatory diagram which shows the arrangement of one example of the beam receiving portion of said multiaxis laser distance measuring device.

As shown in FIGS. 2, 3, and 6, the beam receiving portion 17 is comprised of a beam receiving optical system 17a, interference beam transmitting optical fibers 17b, and photoelectric conversion sensors 17c. Beam receiving optical system 17a is located within a box 31 fixed to the side face of the casing 30 and positioned so that its entrance face to faces exit window portion 30b. The interference beam transmitting optical fibers 17b are mounted into box 31 in a penetrating manner.

Beam receiving optical system 17a is equipped with a beam splitter 170, which receives the interference beam (M+R) transmitted from polarization beam splitter 40a and splits the interference beam (M+R) into a transmitted beam and a reflected beam, a polarization plate 171 and a condenser lens 172, which receive the beam reflected off of beam splitter 170, and an ¼ wave plate 173, which receives the beam transmitted through beam splitter 170.

A polarization beam splitter 174, which splits the incoming beam into a transmitted beam and a reflected beam, is provided to the rear of ¼ wave plate 173 and condenser lenses 175 and 176 are interposed in the respective beam paths of these transmitted and reflected beams. The three beams A, B, and C, which are split by beam receiving optical system 17a, are respectively guided to interference beam transmitting optical fibers 17b, converted to electrical signals by means of photoelectric conversion senser 17c disposed on the opposite end of the interference beam transmitting optical fibers 17b, and transmitted to display 18.

At the beam receiving portion 17 having the above arrangement, the interference beam (M+R) incident on beam splitter 170 is split into two beams, one of which is incident on ¼ wave plate 173 and the other of which is incident on polarization plate 170. Polarization plate 170 is tilted by 45° with respect to polarization beam splitter 40a. The crystal axis of ¼ wave plate 173 is also tilted by 45° with respect to the polarization beam splitter 40a.

Figure 7:
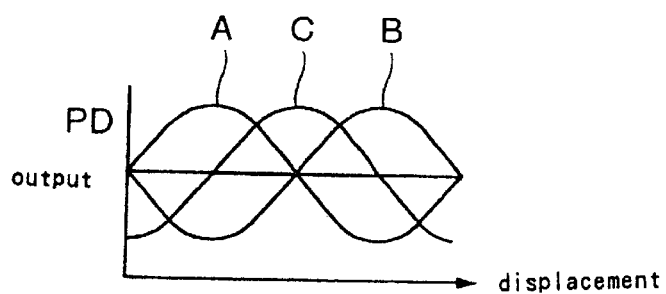
FIG. 7 is a waveform diagram of the electrical signals detected by the beam receiving portion shown in FIG. 6.

As a result, beam A and beam B become shifted in phase by 180° with respect each other and beam C becomes shifted in phase by 90° with respect to beams A and B. The signals output from the three photoelectric conversion senser 17c will thus be as shown in FIG. 7. From these signals, X=A−B and Y=2{C−(A+B)/2} are determined and the displacement d of reflecting target 16 is calculated by computer 20 from the values (X, Y).

The arrangement of the beam receiving portion 17 is not restricted to the arrangement shown in FIG. 6 and the interference beam transmitting optical fiber 17b in this Figure may be omitted so that the beams A, B, and C from condenser lenses 172, 175, and 176 are respectively received directly by photoelectric conversion senser 17c.

Figure 8:
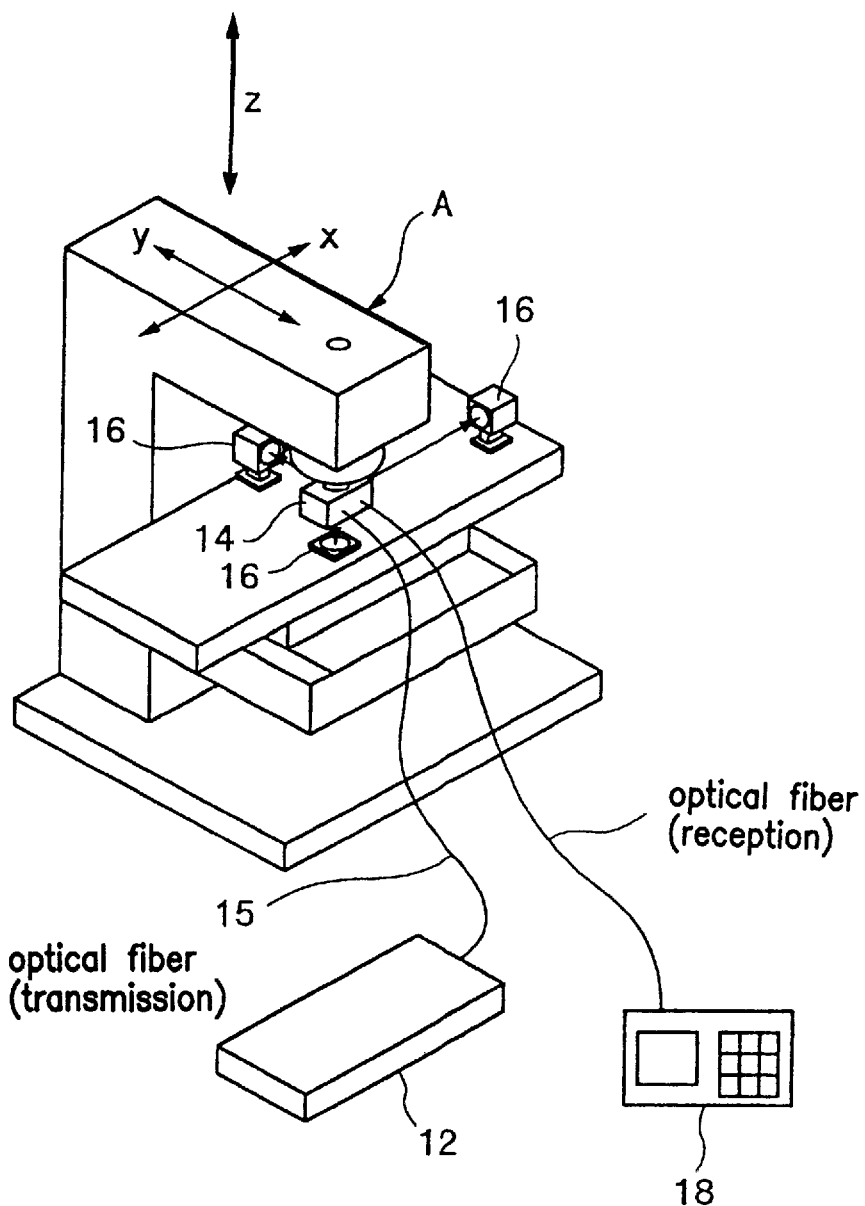
FIG. 8 is a schematic diagram which shows the case where the multiaxis laser distance measuring device by the present invention is applied to a knee type milling machine.

The manner by which measurements and corrections or calibrations of an NC machine tool are performed using the multiaxis distance measuring device with the above arrangement shall now be described. FIG. 8 shows the condition where the multiaxis distance measuring device according to the invention is used to measure the movement accuracies of three axes of an NC machine tool (milling machine A) and to correct these accuracies.

As shown in this Figure, the multiaxis interferometer 14 is fixed to the spindle position, which is a fixed portion of milling machine A, which is the object of measurement. This is done by fixing the multiaxis interferometer 14 to the spindle portion, by the use of magnets, etc.

To portions of milling machine A, which are movable in the x axis direction and the y axis direction of the table and in the z axis direction, directly below the multiaxis interferometer 14, are respectively fixed and disposed reflecting targets 16 in a manner by which they will face multiaxis interferometer 14.

With the multiaxis interferometer 14 in the present preferred embodiment, the above mentioned portion [1] of beam directing mechanism portion 42 is set to be aligned with the y axis direction, portion [2] is set to be aligned with the z axis direction, and portion [4] is set to be aligned with the x axis direction. The reflecting targets 16 are respectively set to be coaxial with through holes 30c to 30e bored in the casing 30 of the multiaxis interferometer 14. Measurements are then made in a fully automatic manner with the casing 30 being fixed as it is.

The initial alignment work performed by the worker for measurement will consist of aligning the optical axes of the reflecting targets 16 and setting the home positions in the three directions. This work will be completed in approximately 25 minutes.

Figure 9:
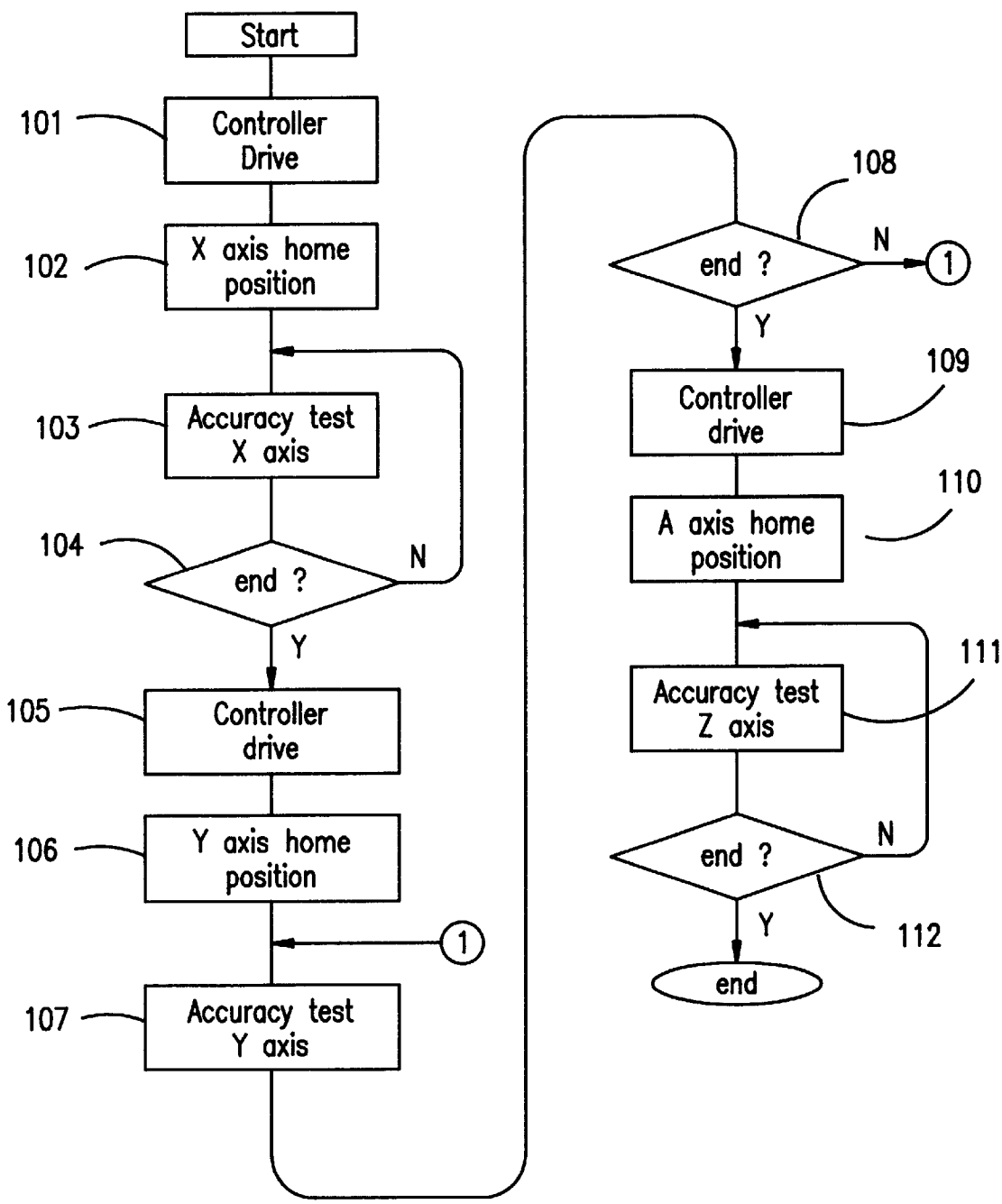
FIG. 9 is a flowchart which shows one example of the measurement process procedure using the multiaxis laser distance measuring device by the present invention.

FIG. 9 shows an example of the control procedure performed by computer 20 at the end of the above work. When the procedure shown in this Figure is started, command signals are transmitted at step 101 to controller 24 to drive driving motor 36c to set the portion [4] of beam directing mechanism portion 42 at a position where it will face entrance and exit window portions 30a and 30b.

Next, at step 102, a control signal is transmitted to NC controller 22 and upon receiving this signal, NC controller 22 moves and positions milling machine A at the home position along the x axis. At step 103, driving commands are sequentially provided to NC controller 22 of milling machine A in accordance with the contents of the software measurement program in a floppy disk loaded in computer 20 and milling machine A is thereby operated according to a prescribed procedure.

The measurement result data, which change in accordance with such operations, are then compared with reference data incorporated in the program and the comparison results are used to calculate correction data, such as the pitch error, and these correction values are taken in by NC controller 22.

The accuracy tests for such a case may include the repeated positioning accuracy test, the repeatedly reversed positioning accuracy test, ISO-230-2, etc. Although the working time will differ according to the test items, it will be approximately 50 minutes as in conventional cases.

When it has been judged at step 104 that all of the tests concerning the x axis have been completed, computer 20 commands the start-up of the controller 24 at step 105 and the motor 36c is driven to set the portion [1] of the beam directing mechanism portion 42 at a position where it faces the entrance and exit window portions 30a and 30b.

After the confirmation of this operation, the various accuracy tests for the y axis are performed according to the procedures similar to those described above (steps 106 to 108) and when it is judged at step 108 that the measurements for the y axis have ended, the measurement optical axis is switched to the z axis and procedures similar to the above are repeated. After the completion of the accuracy tests for the z axis, the system is caused to stop (steps 109 to 112).

The total working time for the above process is about 175 minutes and since the automatic measurement time, from which the time for initial alignment by the worker is excluded, is 150 minutes, the worker is provided with adequate spare time which can be used effectively for other work and since practically all of the work is completed upon completion of the work by the worker, the equipment can thereafter be left alone and the worker will not have to be troubled by the management of working time.

Figure 10:
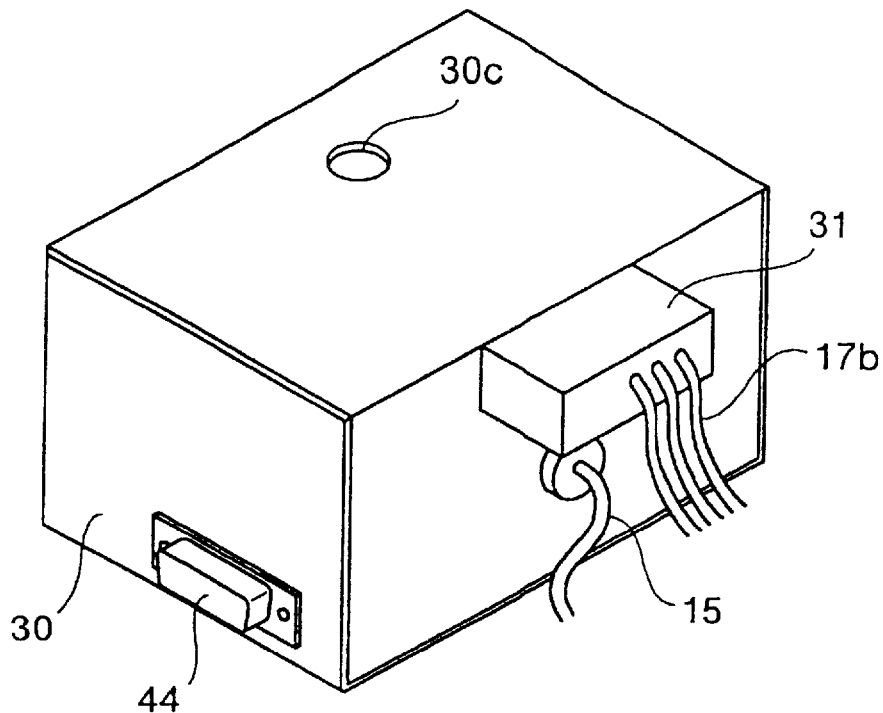
FIG. 10 is an exploded perspective view of the major portions of the multiaxis interferometer of the second preferred embodiment of the multiaxis laser distance measuring device by the present invention.
Figure 10:
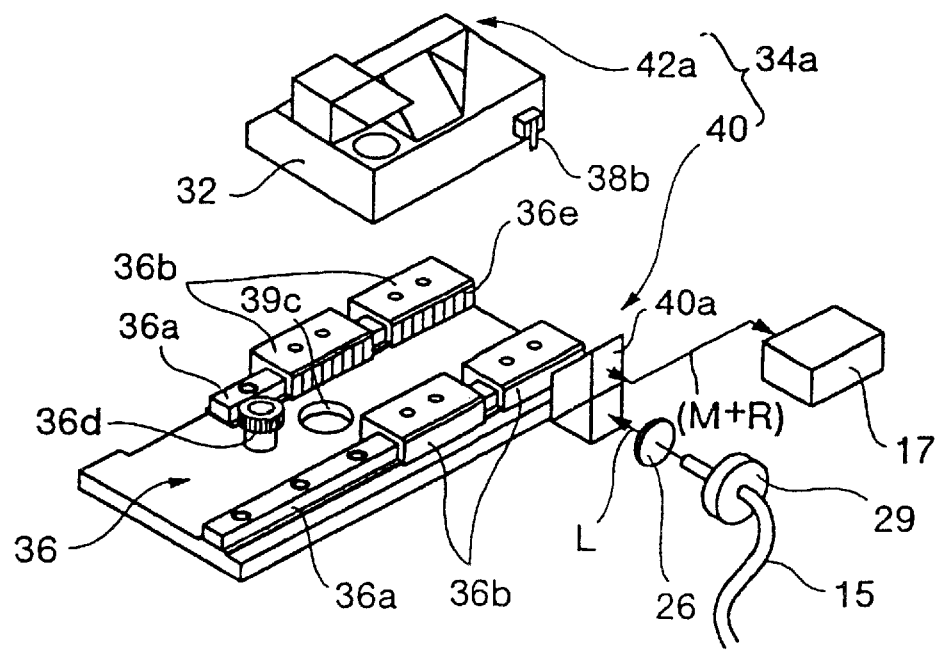
Figure 11:
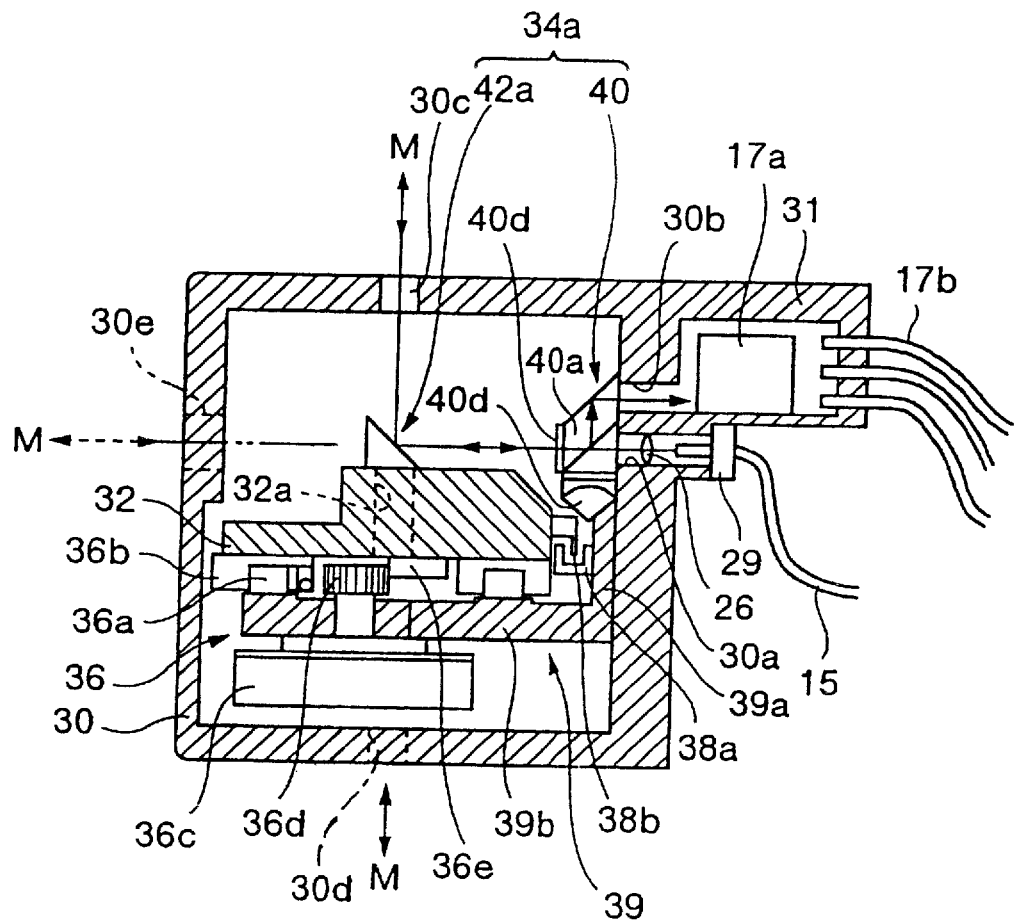
FIG. 11 is a cross-sectional view of the multiaxis interferometer of FIG. 10.
Figure 12:
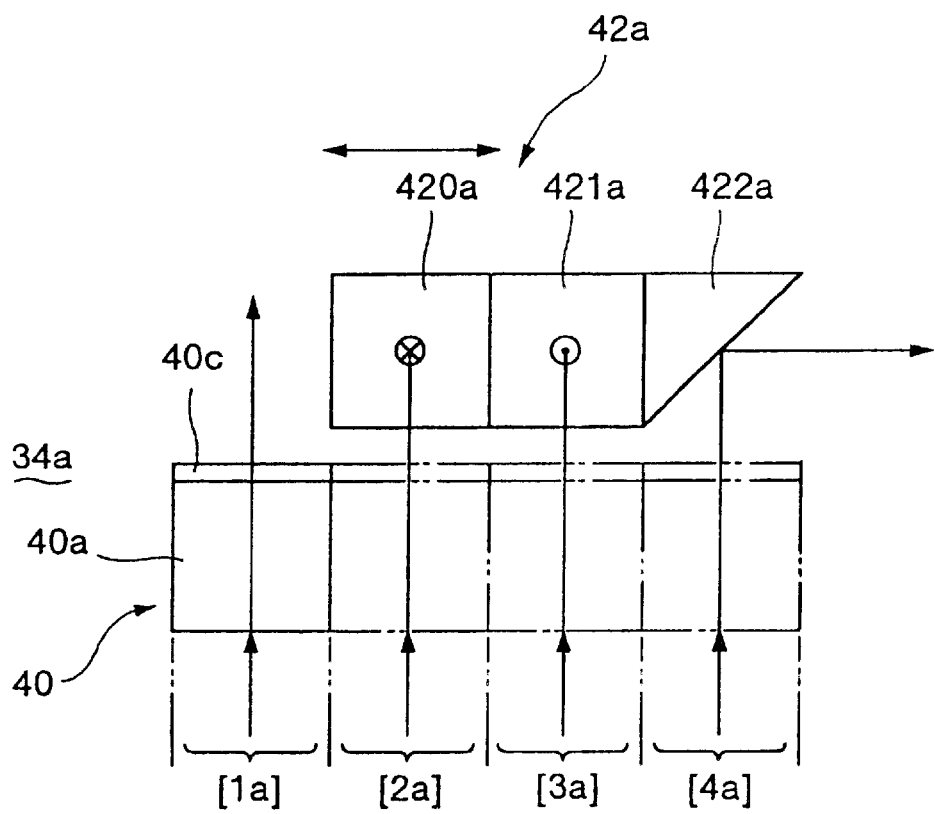
FIG. 12 is a plan view of the interferometer body of said interferometer.

FIGS. 10 to 12 show a second preferred embodiment according to the invention and the portions which are the same as or equivalent to those of the preferred embodiment described above are provided with the same symbols and their descriptions shall be omitted. Only the portions that are characteristic of this preferred embodiment shall be described next. As in the preferred embodiment described above, the interferometer body 34a in the second preferred embodiment shown in these Figures is comprised of an interferometer portion 40 and a beam directing mechanism portion 42a.

As in the first preferred embodiment described above, the interferometer portion 40 is comprised of a polarization beam splitter 40a, a pair of wave plates 10b and 40c, and a corner prism 40d. On the other hand, the beam directing mechanism portion 42a is comprised of a portion [1a], which is not provided with anything, a portion [2a], which is provided with a triangular mirror 420a which reflects the incoming beam L downward, a portion [3a], which is provided with a triangular mirror 421a which reflects the incoming beam L upward, and a portion [4a], which is provided with a triangular mirror 422a which reflects the incoming beam L to the right side.

Effects that are equivalent to those of the first preferred embodiment described above are obtained with the beam directing mechanism portion 42a with the above arrangement since the conditions of the beam paths of measuring beam M, reference beam R, and interference beam (M+R) at portions [1a] to [4a] will be the same as those shown in FIG. 5.

Figure 13:
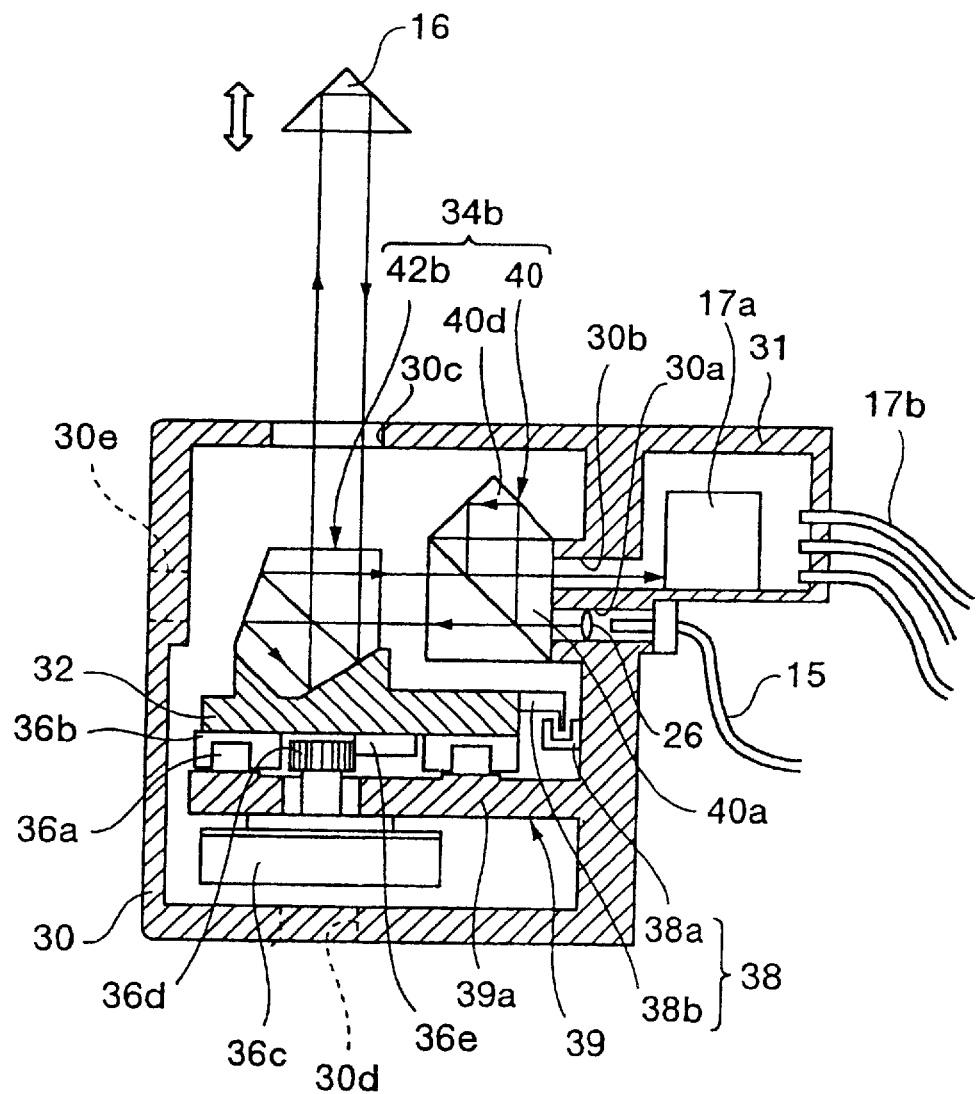
FIG. 13 is a cross-sectional view of the multiaxis interferometer of a third preferred embodiment of the multiaxis laser distance measuring device by the present invention.

FIGS. 13 and 14(a–d) show a third preferred embodiment according to the invention and the portions which are the same as or equivalent to those of the preferred embodiments described above are provided with the same symbols and their descriptions shall be omitted. Only the portions that are characteristic of this preferred embodiment shall be described next. As in the preferred embodiments described above, the interferometer body 34b in the third preferred embodiment shown in these Figures is comprised of an interferometer portion 40 and a beam directing mechanism portion 42b.

The interferometer portion 40 is comprised of a polarization beam splitter 40a and a corner prism 40d. This corner prism 40d is positioned at the upper side of polarization beam splitter 40a so that the structure is practically one in which the pair of ¼ wave plates 40b and 40c have been eliminated from the interferometer portion 40 of the first preferred embodiment.

As in the first preferred embodiment described above, beam directing mechanism portion 42b is comprised of a portion [1b], which is not provided with anything, a portion [2b], which is provided with a pentagonal prism 420b which reflects the incoming beam from polarization beam splitter 40a downward, a portion [3b], which is provided with a pentagonal prism 421b which reflects the incoming light from polarization beam splitter 40a upward, and a portion [4b], which is provided with a pentagonal prism 422b which reflects the incoming beam from polarization beam splitter 40a to the right.

As can be seen from the beam paths of portions [1b] to [4b] shown in FIGS. 14(a) to (d), with the interferometer body 34a with the above arrangement, the measuring beam M, which propagates towards the reflecting target 16, and the measuring beam M, which is reflected by the reflecting target 16 and returns to the beam directing mechanism portion 42b, travel along different beam paths and likewise, the reference beam R is also projected toward a different position upon being reflected inside the corner prism 40d. However, since the interference beam (M+R) is guided to the beam receiving portion 17, automatic distance measurements of an NC machine tool can be performed in the same manner as in the above preferred embodiments.

With the distance measuring device with such an arrangement, since the beam path propagating towards the reflecting target 16 and the beam path returning from reflecting target 16 differ completely, the polarization beam splitter 40a and the pentagonal prisms 420b to 422b will be large. However, since an ¼ wave plate is not used at all in this preferred embodiment, the beam directing mechanism portion 42b will be low in cost.

Figure 15A:
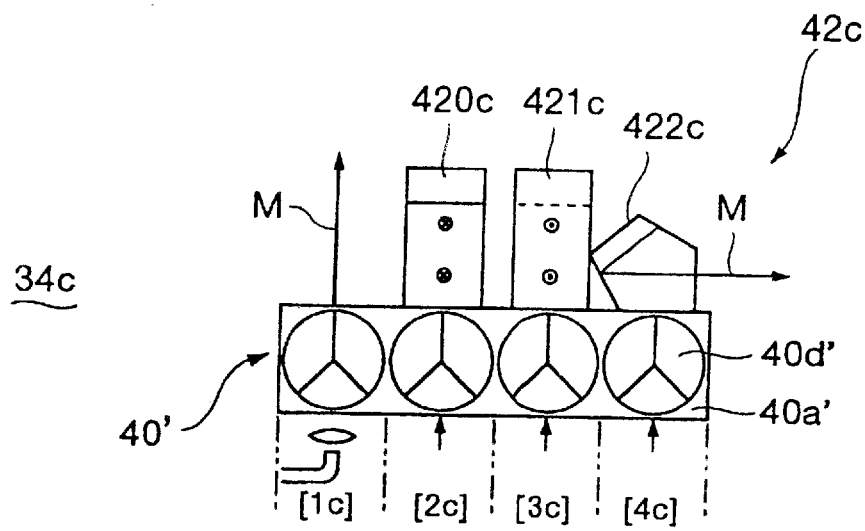
FIGS. 15(a) to 15(c) show a front view, a plan view, and a side view of the interferometer body of the fourth preferred embodiment of the multiaxis laser distance measuring device by the present invention.
Figure 15B:
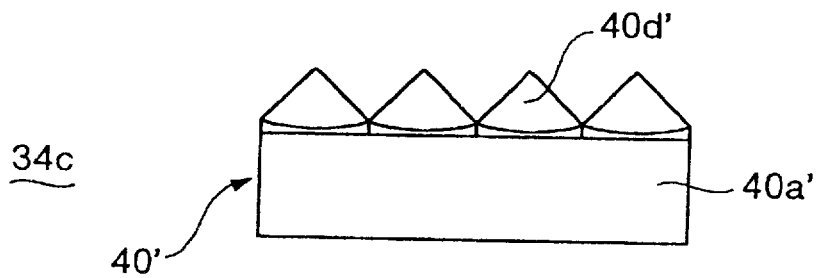
Figure 15C:
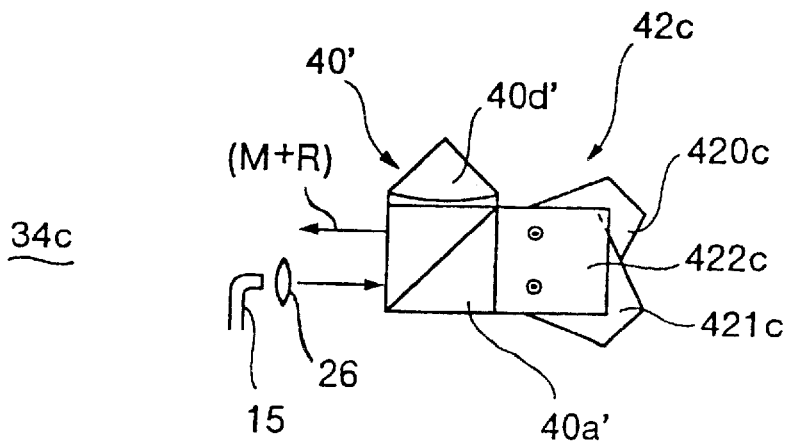

FIGS. 15(a) to (c) show a fourth preferred embodiment according to the invention and the portions which are the same as or equivalent to those of the preferred embodiments described above are provided with the same symbols and their descriptions shall be omitted. Only the portions that are characteristic of this preferred embodiment shall be described next. As in the preferred embodiments described above, the interferometer body 34c in the fourth preferred embodiment shown in this Figure is comprised of an interferometer portion 40' and a beam directing mechanism portion 42b. Both of these portions are disposed on the stage 32.

The interferometer portion 40' is comprised of a polarization beam splitter 40a' and four corner prisms 40d', which are adhered onto the upper surface of polarization beam splitter 40a'. The polarization beam splitter 40a' has a long narrow form that extends in the movement direction of the stage 32 and the front side thereof faces the entrance and exit window portions 30a and 30b of the casing 30.

As in the first preferred embodiment described above, beam directing mechanism portion 42c is comprised of a portion [1c], which is not provided with anything, a portion [2c], which is provided with a pentagonal prism 420c which reflects the incoming beam from the polarization beam splitter 40a' downward, a portion [3c], which is provided with a pentagonal prism 421c which reflects the incoming beam from the polarization beam splitter 40a' upward, and a portion [4c], which is provided with a pentagonal prism 422c which reflects the incoming beam from the polarization beam splitter 40a' to the right.

With the interferometer body 34c with the above arrangement, although the interferometer portion 40' and the beam directing mechanism portion 42c both move along with the stage 32, the beam paths of the beam directing mechanism portion 42c will be the same as those of the third preferred embodiment shown in FIG. 14 and, as a result, effects that are equivalent to those of the third preferred embodiment can be obtained with this preferred embodiment.

Figure 16:
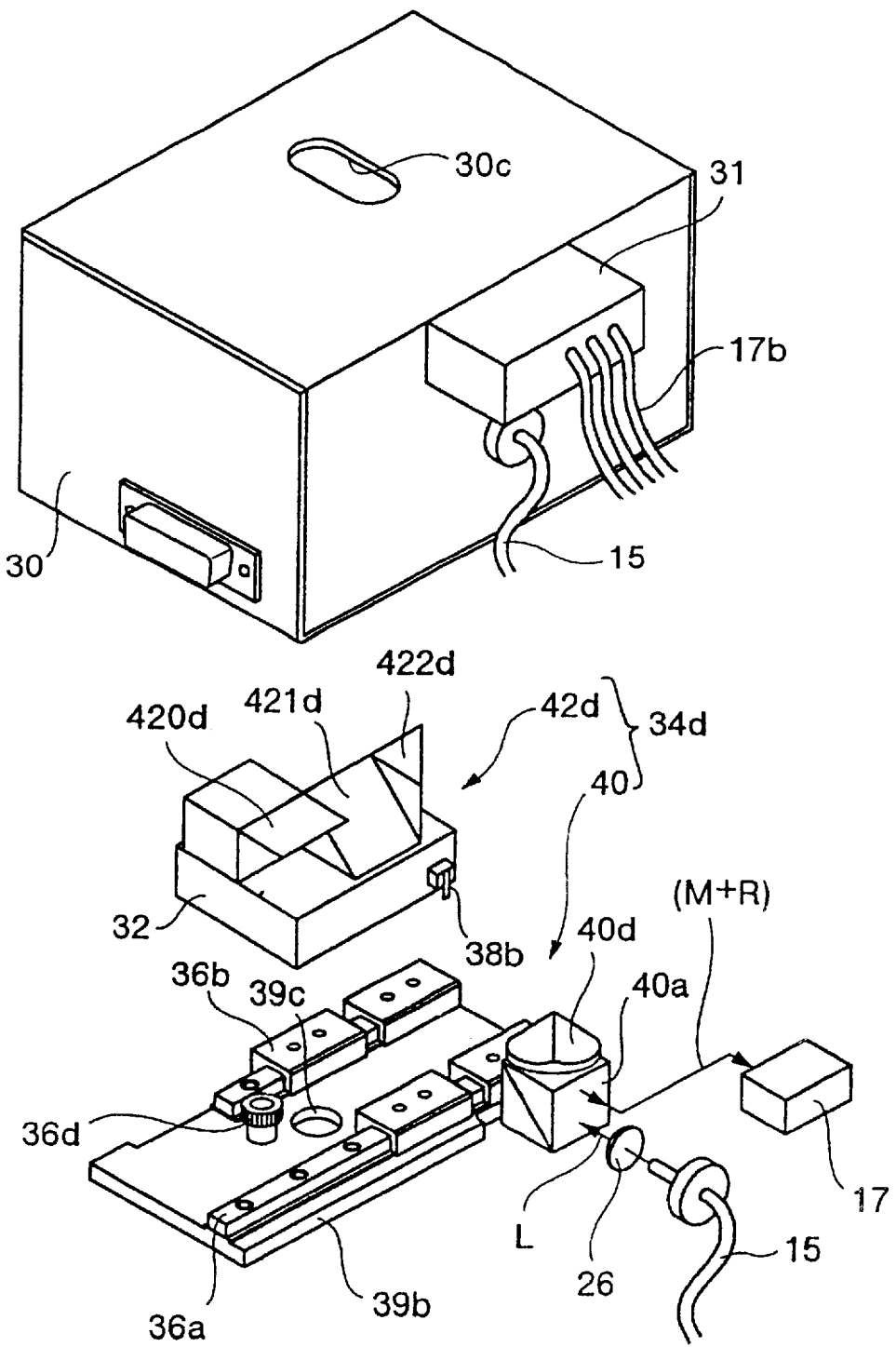
FIG. 16 is an exploded perspective view of the major portions of the multiaxis interferometer of the fifth preferred embodiment of the multiaxis laser distance measuring device by the present invention.

FIG. 16 shows a fifth preferred embodiment according to the invention and the portions which are the same as or equivalent to those of the preferred embodiments described above are provided with the same symbols and their descriptions shall be omitted. Only the portions that are characteristic of this preferred embodiment shall be described next. In the fifth preferred embodiment shown in this Figure, the pentagonal prisms 420b to 422b of the beam directing mechanism portion 42b of the third preferred embodiment are replaced by triangular mirrors 420d to 422d.

With the interferometer body 34d with the above arrangement, automatic distance measurements can be performed for the respective axes of an NC machine tool as in the other preferred embodiments described above and since the beam directing mechanism portion 42d is comprised of triangular mirrors 420d to 422d, the beam directing mechanism portion 42c can be made even lower in cost than that in the third preferred embodiment.

Figure 17:
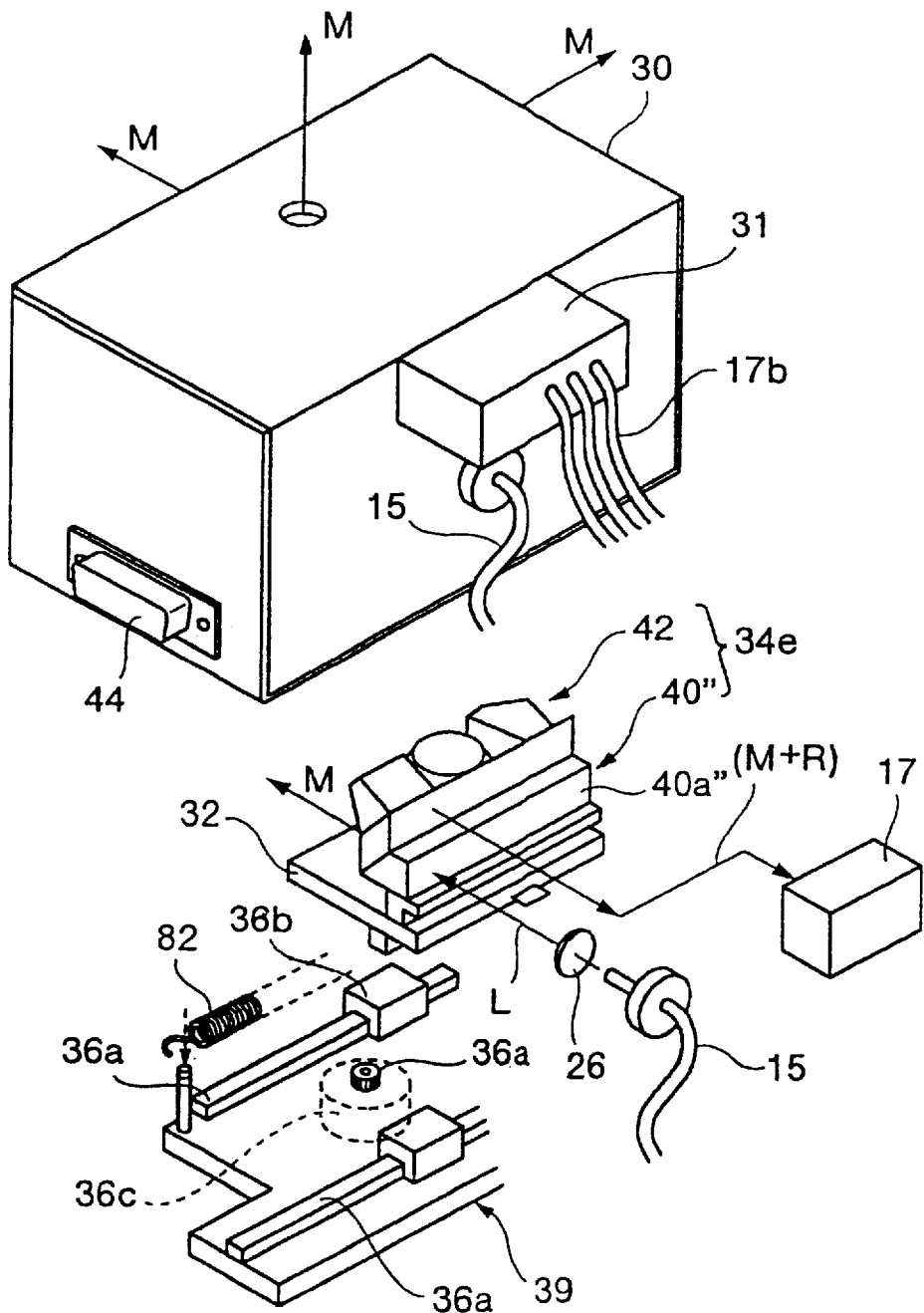
FIG. 17 is an exploded perspective view of the major portions of the multiaxis interferometer of the sixth preferred embodiment of the multiaxis laser distance measuring device by the present invention.
Figure 18A:
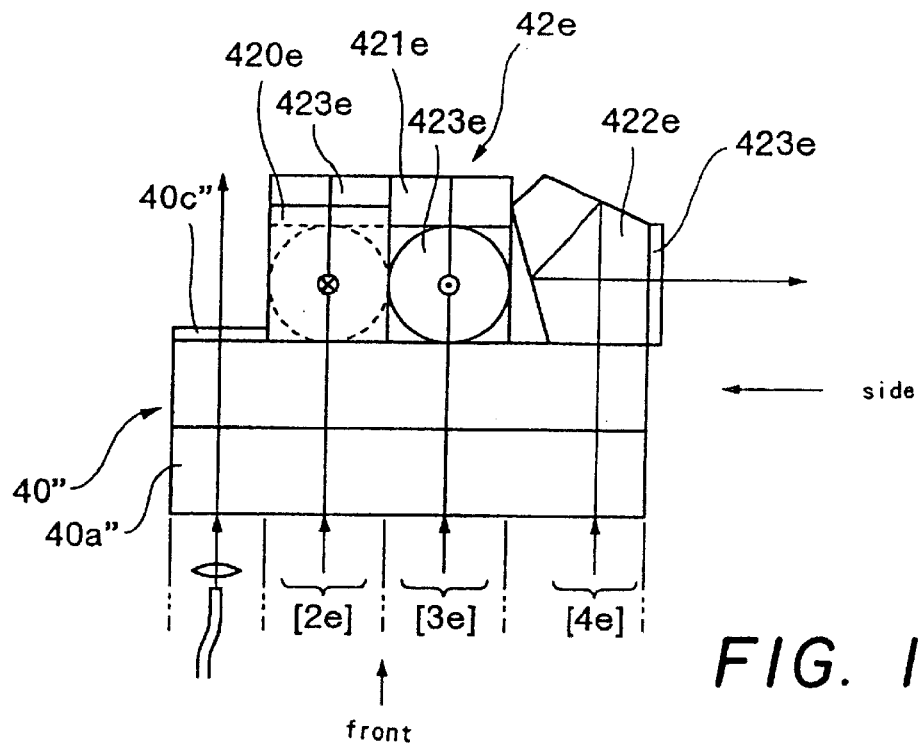
FIG. 18 shows a front view, a plan view, and a side view of the interferometer body of the multiaxis laser distance measuring device shown in FIG. 17.
Figure 18B:
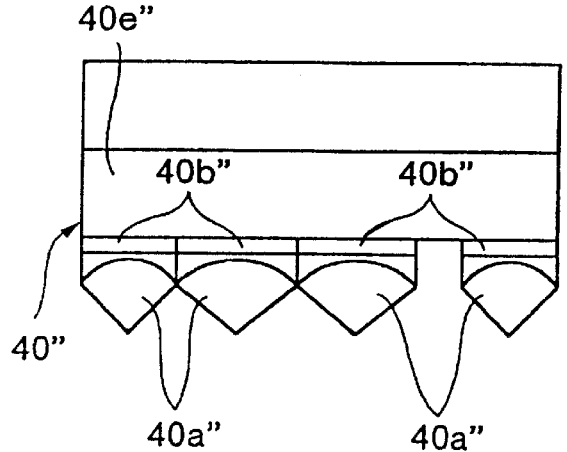
Figure 18C:
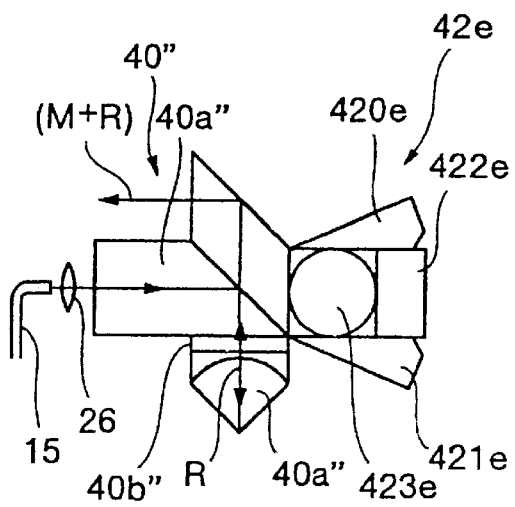

FIGS. 17 and 18 show a sixth preferred embodiment according to the invention and the portions which are the same as or equivalent to those of the preferred embodiments described above are provided with the same symbols and their descriptions shall be omitted. Only the portions that are characteristic of this preferred embodiment shall be described next. As in the preferred embodiments described above, the interferometer body 34e of the sixth preferred embodiment shown in these Figures has an interferometer portion 40" and a beam directing mechanism portion 42e. Both of these portions are disposed on stage 32.

Interferometer portion 40" is comprised of a polarization beam splitter 40a" and four corner prisms 40d", which are adhered via an ¼ wave plate 40b" onto the lower surface of a polarization beam splitter 40a". The polarization beam splitter 40a" has a long narrow form that extends in the movement direction of the stage 32, has a ¼ wave plate 40c" disposed at the exit face at its left end side, and its front side faces the entrance and exit window portions 30a and 30b of the casing 30.

A beam directing mechanism portion 42e is comprised of a portion [1e], which is not provided with anything, a portion [2e], which is provided with a pentagonal prism 420e which reflects the incoming beam from polarization beam splitter 40a" downward, a portion [3e], which is provided with a pentagonal prism 421e which reflects the incoming beam from the polarization beam splitter 40a" upward, and a portion [4e], which is provided with a pentagonal prism 422e, which reflects the incoming beam from the polarization beam splitter 40a" to the right.

The ¼ wave plates 423e are fixed to the exit faces of the penta prisms 420e to 422e. Effects equivalent to those of the preferred embodiments described above can be obtained when the interferometer body 34e, with the above arrangement, is adopted since the respective beam paths of portions [1e] to [4e] will be practically the same as those of the first preferred embodiment shown in FIG. 5. The member with the symbol 82 in FIG. 17 is a coil spring for the elimination of backlash of the rack pinion of moving mechanism 36.

Figure 19:
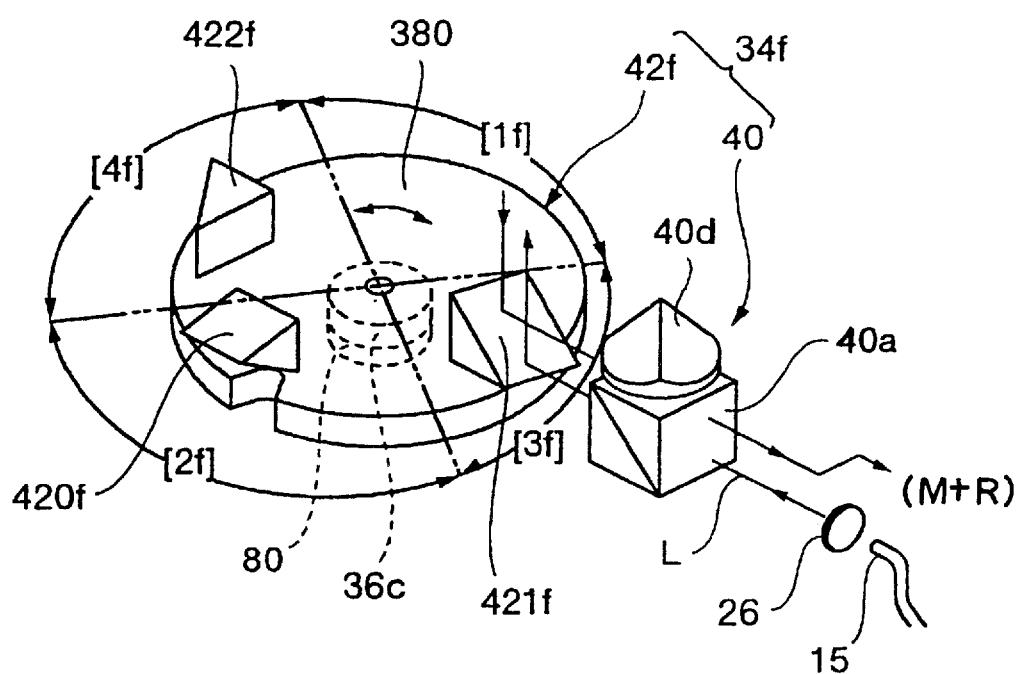
FIG. 19 is an exploded perspective view of the major portions of the multiaxis interferometer of the seventh preferred embodiment of the multiaxis laser distance measuring device by the present invention.
Figure 20:
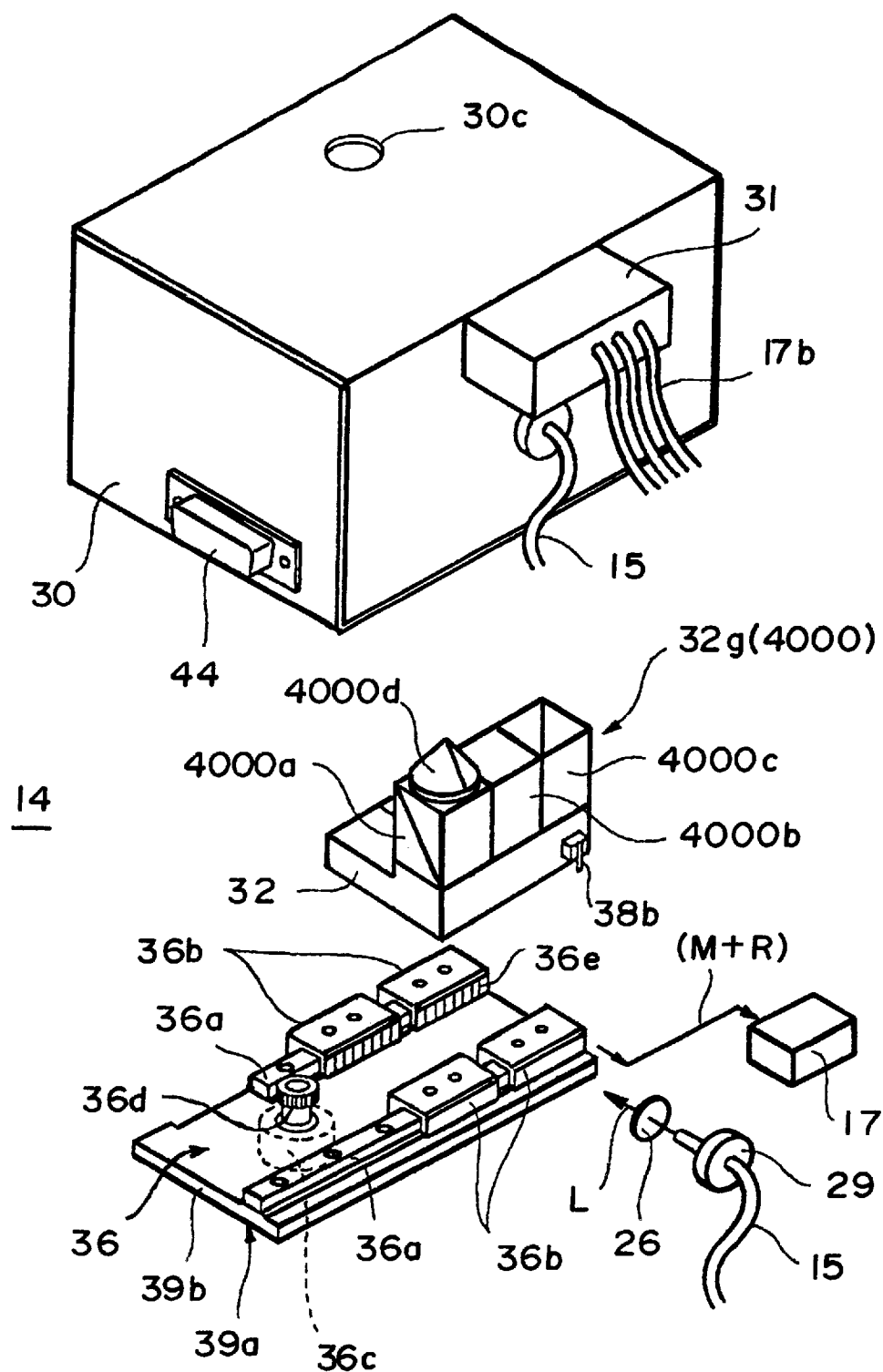
FIG. 20 is a disassembled perspective view of majors of a multiaxis interferometer showing an eighth preferred embodiment of a multi-axis laser distance measurement device according to the invention.
Figure 21:
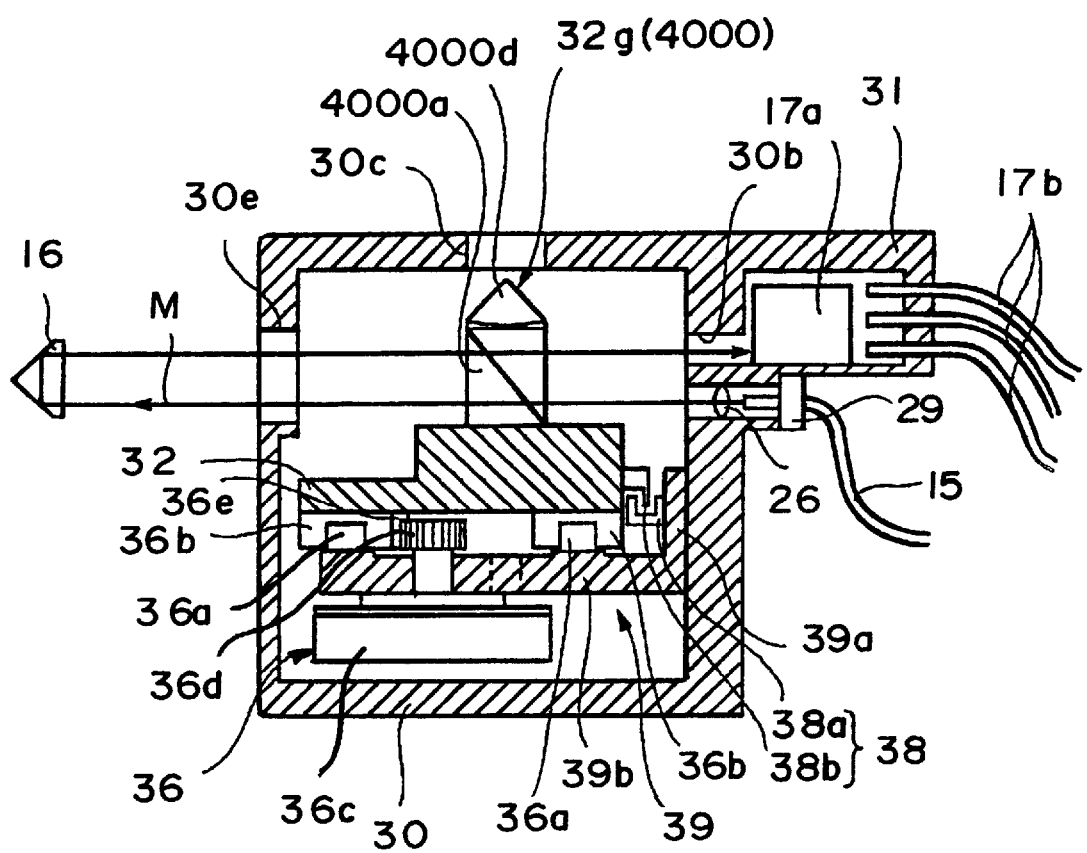
FIG. 21 is a cross-sectional view showing the assembled state of a multiaxis interferometer shown in FIG. 20.
Figure 22A:
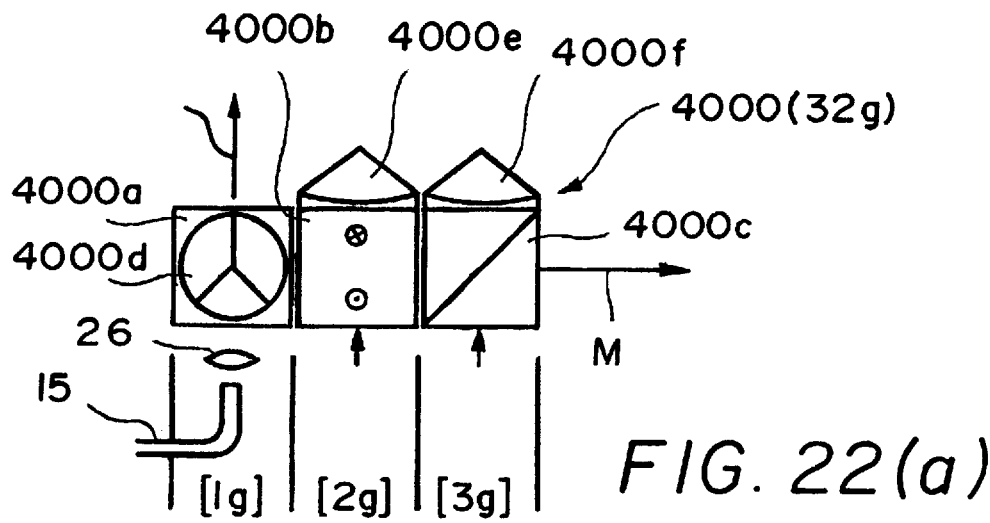
FIGS. 22(a) to 22(c) are a front elevational view, plan view and side elevation view of an interferometer body of a multiaxis laser distance measurement device shown in FIG. 20.
Figure 22B:
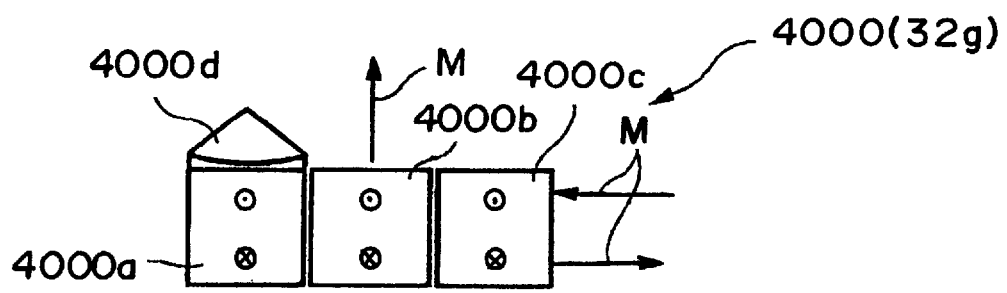
Figure 22C:
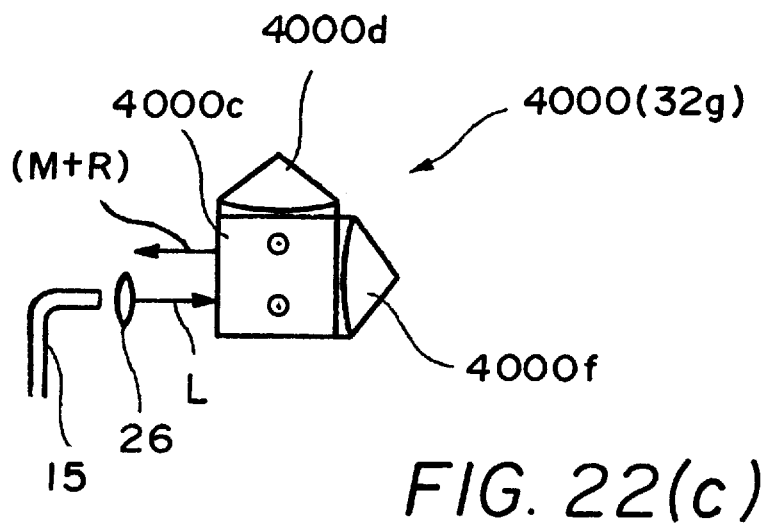

FIG. 19 shows a seventh preferred embodiment according to the invention, and the portions which are the same as or equivalent to those of the preferred embodiments described above are provided with the same symbols and their descriptions shall be omitted. Only the portions that are characteristic of this preferred embodiment shall be described next. As in the preferred embodiments described above, the interferometer body 34f of the seventh preferred embodiment shown in these Figures has an interferometer portion 40 and a beam directing mechanism portion 42f.

As in the third preferred embodiment described above, the interferometer portion 40 is comprised of a polarization beam splitter 40a and a corner prism 40d and polarization beam splitter 40a is fixed so that the front side thereof faces the entrance and exit window portions 30a and 30b. On the other hand, a beam directing mechanism portion 42f is comprised of three reflecting mirrors 420f, 421f, and 422f and these mirrors 420f, 421f, and 422f are respectively set and fixed on a disc-shaped rotating stage 380.

A rotating stage 380 is rotatably supported on a stage 32 and is rotated and driven by an ultrasonic motor 36c, the rotating shaft of which is fixed to the center of the lower side of disc-shaped rotating stage 380. The rotation position of disc-shaped rotating stage 380 is detected by a rotary encoder 80 coupled to driving motor 36c. The reflecting mirrors 420f, 421f, and 422f are disposed at the outer periphery of the disc-shaped rotating stage 380 so that they may face polarization beam splitter 40a.

The disc-shaped rotating stage 380 is divided at equal intervals of 90 degrees into four portions [1f] to [4f]. Reflecting mirrors 420f, 421f, and 422f are disposed on three of these portions [2f] to [4f] while nothing is disposed on the remaining portion [1f]. With the interferometer body 34f having this arrangement, when the portion [1f], which is not provided with anything, is made to face the polarization beam splitter 40a by rotating the disc-shaped rotating stage 380, the incoming beam from the polarization beam splitter 40a is made to propagate rectilinearly towards the reflecting target 16.

When the reflecting mirror 420f is made to face the polarization beam splitter 40a by rotating the disc-shaped rotating mirror 380, the incoming beam from the polarization beam splitter 40a is reflected downward. When the reflecting mirror 421f is made to face the polarization beam splitter 40a by rotating the disc-shaped rotating mirror 380 further, the incoming beam from the polarization beam splitter 40a is reflected upward.

When the reflecting mirror 422f is made to face the polarization beam splitter 40a by rotating disc-shaped rotating mirror 380 even further, the incoming beam from the polarization beam splitter 40a is reflected to the right side.

That is, while the four portions of the beam directing mechanism of the preferred embodiments up to the sixth preferred embodiment were arranged in a straight line, those of the seventh preferred embodiment are arranged along the circumferential direction of the disc-shaped rotating stage 380. The same effects as those of the other preferred embodiments can be obtained with the interferometer body 34f arranged in the above manner and the movement and switching of the beam directing mechanism portion 42f can be made more simple by adopting such an arrangement.

FIGS. 20 through 23 show an eighth preferred embodiment according to the invention, and the portions which are the same as or equivalent to those of the preferred embodiments described above are provided with the same symbols and their descriptions shall be omitted. Only the portions that are characteristic of this preferred embodiment shall be described next. In the preferred embodiment shown in these drawings, the interferometer body 32g is different from the preferred embodiments described above, and the same is provided with an interferometer portion 4000 which is concurrently used as a beam directing mechanism part in the above mentioned preferred embodiments.

The interferometer portion 4000 is comprised of three polarization beam splitters 4000a to 4000c and corner prisms 4000d to 4000f secured to one side of the respective polarization beam splitters 4000a to 4000c, and the polarization beam splitters 4000a to 4000c are disposed in a row on stage 32 so that the polarization beam splitters 4000a to 4000c are respectively opposite the end face of optical fiber 15 and beam receiving part 17. Furthermore, they have the following three portions [1g] to [3g].

At the portion [1g], a corner prism 4000d is disposed at the upper face side thereof so that the measurement beam may pass through relative to the incident beam.

At the portion [2g], the reflection face secured inside the polarization beam splitter 4000b is disposed so that the same is inclined 45 degrees relative to the incident beam as at portion [1g] and the reflection beam is turned upward. A corner prism 4000e is disposed at the rear side thereof. At portion [3g], the reflection face secured inside the polarization beam splitter 4000c is disposed so that the same is inclined 45 degrees relative to the incident beam and the reflection beam is turned right. A corner prism 4000f is disposed at the rear side thereof.

Figure 23A:
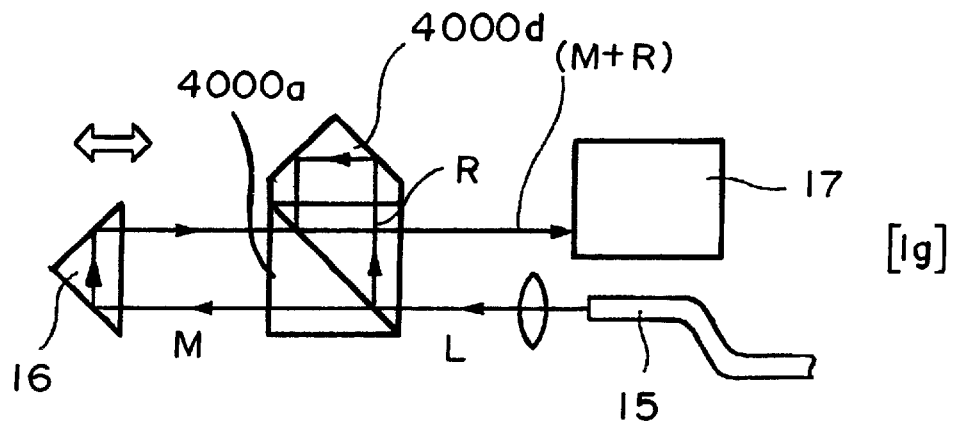
FIGS. 23(a) to 23(c) are a view explaining beam paths at each portion of an interferometer shown in FIG. 22.
Figure 23B:
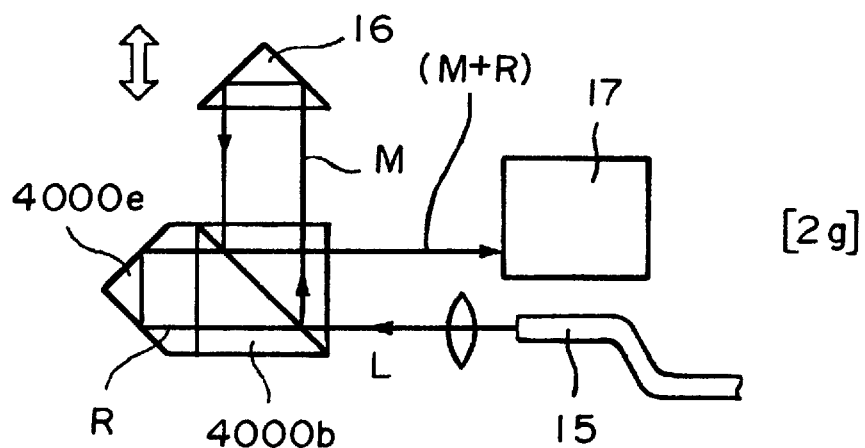
Figure 23C:
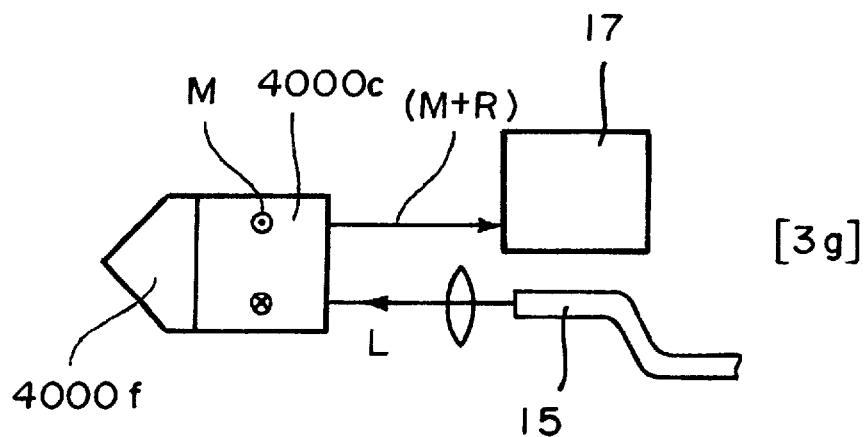
Figure 24:
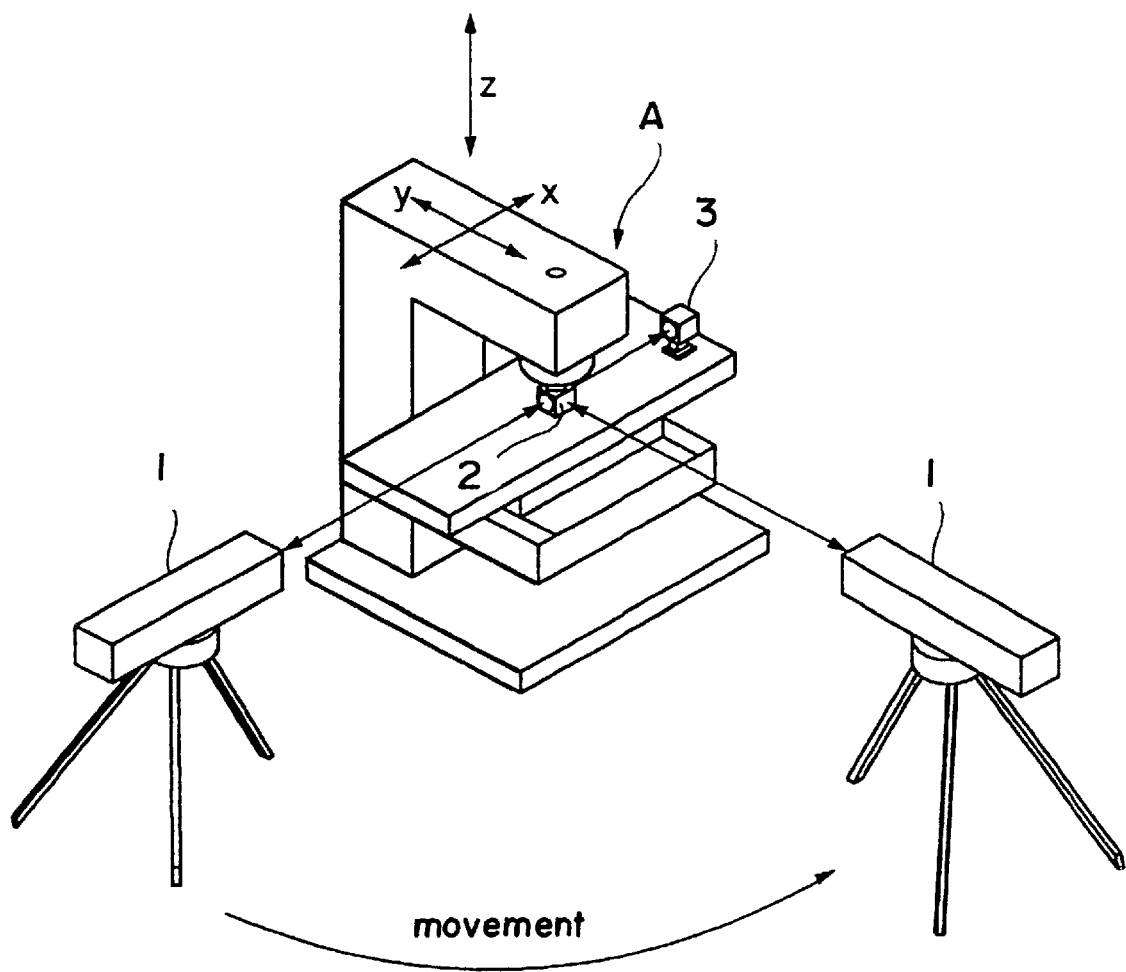
FIG. 24 is a schematic diagram which shows the layout of a prior art distance measuring device as applied to a knee type vertical milling machine.

FIGS. 23(a) to (c) are a detailed view showing the beam paths of interferometer part 4000 of this preferred embodiment. In the same drawing, The laser beam L outgoing from optical fiber 15 is caused to come in polarization beam splitter 4000a at portion [1g], where the same is divided into a transmission beam and a reflection beam, and the transmission beam is made a measurement beam M and is directed to the corner prism 16 side at the rear side. The reflection beam is directed to the corner prism 4000d as a reference beam R. The beam reflected at the corner prism 16, 4000d is again caused to come in the polarization beam splitter 4000a, where interference is caused, and the interfered beams (M+R) are caused to come in the beam receiving part 17.

At portion [2g], the laser beam L outgoing from the optical fiber 15 is caused to come in the polarization beam splitter 4000b, where the same is divided into a transmission beam and a reflection beam, and the reflection beam is made a measurement beam M and is directed to the upper corner prism 16 side. The transmission beam is directed to the corner prism 4000e as a reference beam R. The beam reflected by the corner prism 16, 4000e is again caused to come in the polarization beam splitter 4000b, where interference is caused, and the interfered beams (M+R) are caused to come in the beam receiving part 17.

At portion [3g], the laser beam L outgoing from the optical fiber 15 is caused to come in the polarization beam splitter 4000c, where the same is divided into a transmission beam and a reflection beam, and the reflection beam is made a measurement beam M and is directed to the right side corner prism 16. The transmission beam is directed to the corner prism 4000f as a reference beam. The beam reflected by the corner prism 16, 4000f is again caused to come in the polarization beam splitter 4000c, where interference is caused, and the interfered beams (M+R) are caused to come in the beam receiving part 17.

Thus, according to the interferometer constructed as described above, the measurement beam M directed to the reflection target 16 and measurement beam M reflected by the reflection target 16 and returning to the interferometer parts 4000a to 4000c tread different beam path. Furthermore, although the reference beam R is reflected by the corner prism 40d and is caused to outgo to a different position, the interfered beams (M+R) are led to the beam receiving part 17. Therefore, for example, if the top and down are reversed from the state shown in FIGS. 22(a) to (c) and the interferometer is attached to a milling machine, it is possible to carry out automatic distance measurements of each axis in NC machine tools as in the above mentioned preferred embodiments.

According to a distance measuring device constructed as shown above, although the polarization beam splitters 4000a to 4000c are made large-sized since an optical path directing to a reflection target 16 is completely different from that returning from the reflection target 16, the number of parts is able to be decreased and better practicability thereof will be further increased since the functions of a beam directing mechanism part are concurrently used at the interferometer part 4000.

Furthermore, in the above mentioned embodiments, although the work procedure is in the order of x, y and z axes, it is possible to freely change the order.

Although the work procedure in the above preferred embodiments were performed in the order of the axes x, y, z, this order can be changed as suited.

Furthermore, although the multiaxis interferometer 14 in the preferred embodiments enable distance measurements for the upper side and the lower side in the z axis direction, arrangements can be made to measure only one side or both sides as necessary.

What is claimed is:

1. A multiaxis laser distance measuring device comprising:

a beam source portion for emitting a laser beam, a multiaxis interferometer equipped with an interferometer body having a stage that is linearly or rotatable movable, and a beam directing mechanism set onto said stage for splitting the incoming laser beam and directing the beam toward either the orthogonal x, y, or z axes of an NC machine tool, and transmitting the interference beam resulting from the interference of the measuring beam with the reference beam, and a switching mechanism for controlling movement of the stage to move the beam directing mechanism into a position that directs said beam along either said x, y, or z axes, an optical fiber, which is disposed between the beam source portion and the interferometer body for guiding the laser beam from the beam source portion to the interferometer body, a plurality of reflecting targets which are fixed on the measurement positions of the NC machine tool for receiving the laser beam projected in the x, y, or z axis direction and reflecting the beam back towards the interferometer body, a beam receiving portion for receiving the interference beam from the interferometer body, a controller for controlling the switching mechanism, and a control unit for operating the NC machine tool in the x, y, and z axis directions in accordance with a prescribed procedure, and comparing the distance measurement data obtained by the beam receiving portion at the beam source portion with priorly set reference data to provide the NC machine tool with correction values, and commanding a switching operation to the controller each time the measurements for one of the axes, x, y, and z, have been completed.

2. The multiaxis laser distance measuring device set forth in claim 1, wherein:

the multiaxis interferometer comprises:

a casing having an entrance window portion which faces the optical fiber and an exit window portion which faces the beam receiving portion, and wherein said state is disposed inside the casing in a linearly movable or rotatably movable manner so that it may face the entrance/exit window portion, and the switching mechanism comprises:

a moving mechanism for moving the stage linearly or rotatably to cause the beam directing mechanism portion to face the entrance/exit window portion, and a detection means for detecting a stoppage position of the stage.

3. The multiaxis laser distance measuring device set forth in claim 2, wherein:

the interferometer body is equipped with an interferometry portion which is disposed along the movement direction of the moving mechanism and is fixed and set on the stage, and said beam directing mechanism which is set on the stage and to the rear of the interferometry portion, and wherein the beam directing mechanism has a portion for causing the incoming beam from the interferometry portion to propagate rectilinearly, a portion for reflecting the incoming beam from the interferometry portion upward or downward, and a portion for reflecting the incoming beam from the interferometry portion to the side.

4. The multiaxis laser distance measuring device set forth in claim 2, wherein:

the interferometer body is provided with the interferometry portion being fixed and set on the rear side of the entrance/exit window portion and with the beam directing mechanism portion being set on the stage side, and the beam directing mechanism has a portion for causing the incoming beam from the interferometry portion to propagate rectilinearly, a portion for reflecting the incoming beam from the interferometry portion upward or downward, and a portion for reflecting the incoming beam from the interferometry portion to the side.

5. The multiaxis laser distance measuring device set forth in claim 1, wherein:

the multiaxis interferometer comprises:

a casing having an entrance window portion which faces the optical fiber and an exit window portion which faces the beam receiving portion, and wherein said stage is disposed inside the casing in a linearly movable manner so that it may face the entrance/exit window portion, and said interferometer body has an interferometry portion for causing the incident laser beam to be projected in the x, y, z axis direction, and the switching mechanism comprises:

a moving mechanism for moving the stage linearly to cause the interferometry portion to face the entrance/exit window portion, and a detection means for detecting a stoppage position of the stage.

* * * * *